United States Patent
Mohammad Soleymani et al.

(10) Patent No.: US 12,289,743 B2
(45) Date of Patent: Apr. 29, 2025

(54) COORDINATED INTER-UE RESOURCE ALLOCATION

(71) Applicant: Fraunhofer-Gesellschaft zur Foerderung der angewandten Forschung e.V., Munich (DE)

(72) Inventors: Dariush Mohammad Soleymani, Erlangen (DE); Martin Leyh, Erlangen (DE); Elke Roth-Mandutz, Erlangen (DE); Shubhangi Bhadauria, Erlangen (DE); Mehdi Harounabadi, Erlangen (DE); Dietmar Lipka, Erlangen (DE); Bernhard Niemann, Erlangen (DE); Amany Abdelkader Ahmed Abdou Mohamed, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 18/057,729

(22) Filed: Nov. 21, 2022

(65) Prior Publication Data
US 2023/0276474 A1    Aug. 31, 2023

Related U.S. Application Data

(63) Continuation of application No. PCT/EP2021/063703, filed on May 21, 2021.

(30) Foreign Application Priority Data

May 22, 2020 (EP) .................... 20175972
Oct. 21, 2020 (EP) .................... 20203172

(51) Int. Cl.
*H04W 72/40* (2023.01)
*H04W 72/02* (2009.01)
(Continued)

(52) U.S. Cl.
CPC .......... *H04W 72/40* (2023.01); *H04W 72/02* (2013.01); *H04W 72/1263* (2013.01);
(Continued)

(58) Field of Classification Search
CPC ..... H04W 72/40; H04W 72/02; H04W 72/04; H04W 72/12; H04W 72/1263;
(Continued)

(56) References Cited

U.S. PATENT DOCUMENTS 11,601,789 B2 *   3/2023   Panteleev ......... H04W 72/1263
2020/0084738 A1   3/2020   Nguyen
(Continued)

FOREIGN PATENT DOCUMENTS

| CN | 110972278 A | 4/2020 |
|---|---|---|
| WO | 2019224893 A1 | 11/2019 |
| WO | WO-2022028490 A1 * | 2/2022 |

OTHER PUBLICATIONS

International Preliminary Report on Patentability for PCT Application PCT/EP2021/063703, mailed Oct. 14, 2022, 27 pages.
(Continued)

*Primary Examiner* — Un C Cho
*Assistant Examiner* — Lalita W Pace
(74) *Attorney, Agent, or Firm* — Perkins Coie LLP; Michael A. Glenn

(57) ABSTRACT

Embodiments provide a method for sharing unused resources between at least two transceivers of a wireless communication system, at least a second transceiver of the at least two transceivers operating in a sidelink in-coverage,
(Continued)

out of coverage or partial coverage scenario, in which resources for a sidelink communication over a sidelink are pre-configured by the wireless communication system or scheduled autonomously by the second transceiver, the method having: reporting, by a first transceiver of the at least two transceivers, a set of unused resources of the first transceiver to the second transceiver, determining, by the second transceiver, a set of candidate resources out of the resources of the sidelink, the set of candidate resources comprising at least a part of the unused resources of the first transceiver, performing, by the second transceiver, a sidelink transmission using selected resources selected out of the set of candidate resources.

14 Claims, 13 Drawing Sheets

(51) Int. Cl.
*H04W 72/1263* (2023.01)
*H04W 72/52* (2023.01)
*H04W 4/46* (2018.01)
*H04W 74/0808* (2024.01)

(52) U.S. Cl.
CPC ............. *H04W 72/52* (2023.01); *H04W 4/46* (2018.02); *H04W 74/0808* (2013.01)

(58) Field of Classification Search
CPC ..... H04W 72/52; H04W 72/50; H04W 72/20; H04W 4/46; H04W 74/0808; H04W 74/0816; H04W 74/0825; H04W 72/25
See application file for complete search history.

(56) References Cited

U.S. PATENT DOCUMENTS

| | | | |
|---|---|---|---|
| 2021/0243773 A1 | 8/2021 | Osawa et al. | |
| 2021/0314920 A1 | 10/2021 | Li et al. | |
| 2021/0352626 A1* | 11/2021 | Sarkis | H04W 72/20 |
| 2022/0046664 A1* | 2/2022 | Hosseini | H04W 72/1263 |
| 2022/0095280 A1* | 3/2022 | Farag | H04W 72/23 |
| 2022/0322359 A1* | 10/2022 | Ye | H04W 72/02 |
| 2022/0322360 A1* | 10/2022 | Ye | H04W 4/40 |
| 2023/0156750 A1* | 5/2023 | Wang | H04W 72/40 |
| | | | 370/329 |

OTHER PUBLICATIONS

International Search Report & Written Opinion for PCT Application PCT/EP2021/063703, mailed Sep. 17, 2021, 7 pages.
3GPP TR 37.885 V15.3.0 (Jun. 2019), Study on evaluation methodology of new Vehicle-to-Everything (V2X) use cases for LTE and NR; (Release 15).
3GPP TR 38.885 V16.0.0 (Mar. 2019), Study on NR Vehicle-to-Everything (V2X), (Release 16).
3GPP TS 23.334 V16.0.0 (Jun. 2019), IP Multimedia Subsystem (IMS) Application Level Gateway (IMS-ALG)—IMS Access Gateway (IMS-AGW) interface: Procedures descriptions (Release 16).
3GPP TS 36.300 V16.1.0 (Mar. 2020), Evolved Universal Terrestrial Radio Access (E-UTRA) and Evolved Universal Terrestrial Radio Access Network (E-UTRAN); Overall description; Stage 2 (Release 16).
3GPP TS 36.331 V16.2.0 (Sep. 2020), Evolved Universal Terrestrial Radio Access (E-UTRA); Radio Resource Control (RRC); Protocol specification (Release 16).
3GPP TS 38.213 V16.1.0 (Mar. 2020), Physical layer procedures for control (Release 16).
3GPP TS 38.214 V16.1.0 (Mar. 2020), Physical layer procedures for data (Release 16).
3GPP TS 38.331 V16.0.0 (Mar. 2020), Radio Resource Control (RRC) protocol specification (Release 16).
3GPP TSG RAN #86, RP-192834, TCL Communication, Views on Sidelink_Enhancement Priorities for R17, Dec. 9-12, 2019.
3GPP TSG RAN Meeting #86, RP-193231, LG Electronics, New WID on NR sidelink enhancement, Dec. 9-12, 2019.
3GPP TSG RAN WG1 Meeting #96, R1-1903623, Intel Corporation, Feature Lead Summary for NR-V2X AI—7.2.4.1.4 Resource Allocation Mechanism, Athens, Greece, Feb. 25-Mar. 1, 2019.
3GPP TSG RAN WG2 #85, R2-140175, ITRI, Discussion on Radio Resource Allocation for ProSe D2D Service, Prague, Czech Republic, Feb. 10-14, 2014).
ETSI TR 137 985 V16.0.0 (Jul. 2020), LTE; 5G; Overall description of Radio Access Network (RAN) aspects for Vehicle-to-everything (V2X) based on LTE and NR (3GPP TR 37.985 version 16.0.0 Release 16).
ETSI TS 123 303 V17.0.0 (May 2022), Universal Mobile Telecommunications System (UMTS); LTE; Proximity-based services (ProSe); Stage 2 (3GPP TS 23.303 version 17.0.0 Release 17).
3GPPTSG RAN WG1 #98bis LG Electronics, R1-1910779, Discussion on resource allocation for Mode 2, 3GPP Server Publication Date: Oct. 8, 2019 (14 pages).

* cited by examiner

COORDINATED INTER-UE RESOURCE ALLOCATION

CROSS-REFERENCE TO RELATED APPLICATIONS

This application is a continuation of copending International Application No. PCT/EP2021/063703, filed May 21, 2021, which is incorporated herein by reference in its entirety, and additionally claims priority from European Application No. 20175972.7, filed May 22, 2020, and from European Application No. 20203172.0, filed Oct. 21, 2020, which is also incorporated herein by reference in its entirety.

TECHNICAL FIELD

Embodiments of the present application relate to the field of wireless communication, and more specifically, to wireless communication between a plurality of user equipments via the sidelink, SL. Some embodiment relate to coordinated Inter-UE Resource Allocation.

BACKGROUND OF THE INVENTION

FIG. 1 is a schematic representation of an example of a terrestrial wireless network 100 including, as is shown in FIG. 1(a), a core network 102 and one or more radio access networks RAN1, RAN2, . . . RANN. FIG. 1(b) is a schematic representation of an example of a radio access network RANn that may include one or more base stations gNB1 to gNB5, each serving a specific area surrounding the base station schematically represented by respective cells 1061 to 1065. The base stations are provided to serve users within a cell. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enables these devices to collect and exchange data across an existing network infrastructure. FIG. 1(b) shows an exemplary view of five cells, however, the RANn may include more or less such cells, and RANn may also include only one base station. FIG. 1(b) shows two users UE1 and UE2, also referred to as user equipment, UE, that are in cell 1062 and that are served by base station gNB2. Another user UE3 is shown in cell 1064 which is served by base station gNB4. The arrows 1081, 1082 and 1083 schematically represent uplink/downlink connections for transmitting data from a user UE1, UE2 and UE3 to the base stations gNB2, gNB4 or for transmitting data from the base stations gNB2, gNB4 to the users UE1, UE2, UE3. Further, FIG. 1(b) shows two IoT devices 1101 and 1102 in cell 1064, which may be stationary or mobile devices. The IoT device 1101 accesses the wireless communication system via the base station gNB4 to receive and transmit data as schematically represented by arrow 1121. The IoT device 1102 accesses the wireless communication system via the user UE3 as is schematically represented by arrow 1122. The respective base station gNB1 to gNB5 may be connected to the core network 102, e.g., via the S1 interface, via respective backhaul links 1141 to 1145, which are schematically represented in FIG. 1(b) by the arrows pointing to "core". The core network 102 may be connected to one or more external networks. Further, some or all of the respective base station gNB1 to gNB5 may connected, e.g., via the S1 or X2 interface or the XN interface in NR, with each other via respective backhaul links 1161 to 1165, which are schematically represented in FIG. 1(b) by the arrows pointing to "gNBs".

For data transmission a physical resource grid may be used. The physical resource grid may comprise a set of resource elements to which various physical channels and physical signals are mapped. For example, the physical channels may include the physical downlink, uplink and sidelink shared channels (PDSCH, PUSCH, PSSCH) carrying user specific data, also referred to as downlink, uplink and sidelink payload data, the physical broadcast channel (PBCH) carrying for example a master information block (MIB), the physical downlink shared channel (PDSCH) carrying for example a system information block (SIB), the physical downlink, uplink and sidelink control channels (PDCCH, PUCCH, PSSCH) carrying for example the downlink control information (DCI), the uplink control information (UCI) and the sidelink control information (SCI). For the uplink, the physical channels, or more precisely the transport channels according to 3GPP, may further include the physical random access channel (PRACH or RACH) used by UEs for accessing the network once a UE is synchronized and has obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length, e.g., 1 ms. Each subframe may include one or more slots of 12 or 14 OFDM symbols depending on the cyclic prefix (CP) length. All OFDM symbols may be used for DL or UL or only a subset, e.g., when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g., DFT-s-OFDM. Other waveforms, like non-orthogonal waveforms for multiple access, e.g., filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the NR (5G), New Radio, standard.

The wireless network or communication system depicted in FIG. 1 may by a heterogeneous network having distinct overlaid networks, e.g., a network of macro cells with each macro cell including a macro base station, like base station gNB1 to gNB5, and a network of small cell base stations (not shown in FIG. 1), like femto or pico base stations.

In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the NR (5G), new radio, standard.

In mobile communication networks, for example in a network like that described above with reference to FIG. 1, like an LTE or 5G/NR network, there may be UEs that communicate directly with each other over one or more sidelink (SL) channels, e.g., using the PC5 interface. UEs that communicate directly with each other over the sidelink may include vehicles communicating directly with other vehicles (V2V communication), vehicles communicating with other entities of the wireless communication network (V2X communication), for example roadside entities, like traffic lights, traffic signs, or pedestrians. Other UEs may not be vehicular related UEs and may comprise any of the above-mentioned devices. Such devices may also communicate directly with each other (D2D communication) using the SL channels.

When considering two UEs directly communicating with each other over the sidelink, both UEs may be served by the same base station so that the base station may provide sidelink resource allocation configuration or assistance for the UEs. For example, both UEs may be within the coverage area of a base station, like one of the base stations depicted in FIG. 1. This is referred to as an "in-coverage" scenario. Another scenario is referred to as an "out-of-coverage" scenario. It is noted that "out-of-coverage" does not mean that the two UEs are not within one of the cells depicted in FIG. 1, rather, it means that these UEs
- may not be connected to a base station, for example, they are not in an RRC connected state, so that the UEs do not receive from the base station any sidelink resource allocation configuration or assistance, and/or
- may be connected to the base station, but, for one or more reasons, the base station may not provide sidelink resource allocation configuration or assistance for the UEs, and/or
- may be connected to the base station that may not support NR V2X services, e.g., GSM, UMTS, LTE base stations.

When considering two UEs directly communicating with each other over the sidelink, e.g., using the PC5 interface, one of the UEs may also be connected with a BS, and may relay information from the BS to the other UE via the sidelink interface. The relaying may be performed in the same frequency band (in-band-relay) or another frequency band (out-of-band relay) may be used. In the first case, communication on the Uu and on the sidelink may be decoupled using different time slots as in time division duplex, TDD, systems.

FIG. 2 is a schematic representation of an in-coverage scenario in which two UEs directly communicating with each other are both connected to a base station. The base station gNB has a coverage area that is schematically represented by the circle 200 which, basically, corresponds to the cell schematically represented in FIG. 1. The UEs directly communicating with each other include a first vehicle 202 and a second vehicle 204 both in the coverage area 200 of the base station gNB. Both vehicles 202, 204 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. In other words, the gNB provides SL resource allocation configuration or assistance for the UEs, and the gNB assigns the resources to be used for the V2V communication over the sidelink. This configuration is also referred to as a mode 1 configuration in NR V2X or as a mode 3 configuration in LTE V2X.

FIG. 3 is a schematic representation of an out-of-coverage scenario in which the UEs directly communicating with each other are either not connected to a base station, although they may be physically within a cell of a wireless communication network, or some or all of the UEs directly communicating with each other are to a base station but the base station does not provide for the SL resource allocation configuration or assistance. Three vehicles 206, 208 and 210 are shown directly communicating with each other over a sidelink, e.g., using the PC5 interface. The scheduling and/or interference management of the V2V traffic is based on algorithms implemented between the vehicles. This configuration is also referred to as a mode 2 configuration in NR V2X or as a mode 4 configuration in LTE V2X. As mentioned above, the scenario in FIG. 3 which is the out-of-coverage scenario does not necessarily mean that the respective mode 2 UEs (in NR) or mode 4 UEs (in LTE) are outside of the coverage 200 of a base station, rather, it means that the respective mode 2 UEs (in NR) or mode 4 UEs (in LTE) are not served by a base station, are not connected to the base station of the coverage area, or are connected to the base station but receive no SL resource allocation configuration or assistance from the base station. Thus, there may be situations in which, within the coverage area 200 shown in FIG. 2, in addition to the NR mode 1 or LTE mode 3 UEs 202, 204 also NR mode 2 or LTE mode 4 UEs 206, 208, 210 are present.

Naturally, it is also possible that the first vehicle 202 is covered by the gNB, i.e. connected with Uu to the gNB, wherein the second vehicle 204 is not covered by the gNB and only connected via the PC5 interface to the first vehicle 202, or that the second vehicle is connected via the PC5 interface to the first vehicle 202 but via Uu to another gNB, as will become clear from the discussion of FIGS. 4 and 5.

FIG. 4 is a schematic representation of a scenario in which two UEs directly communicating with each, wherein only one of the two UEs is connected to a base station. The base station gNB has a coverage area that is schematically represented by the circle 200 which, basically, corresponds to the cell schematically represented in FIG. 1. The UEs directly communicating with each other include a first vehicle 202 and a second vehicle 204, wherein only the first vehicle 202 is in the coverage area 200 of the base station gNB. Both vehicles 202, 204 are connected directly with each other over the PC5 interface.

FIG. 5 is a schematic representation of a scenario in which two UEs directly communicating with each, wherein the two UEs are connected to different base stations. The first base station gNB1 has a coverage area that is schematically represented by the first circle 2001, wherein the second station gNB2 has a coverage area that is schematically represented by the second circle 2002. The UEs directly communicating with each other include a first vehicle 202 and a second vehicle 204, wherein the first vehicle 202 is in the coverage area 2001 of the first base station gNB1 and connected to the first base station gNB1 via the Uu interface, wherein the second vehicle 204 is in the coverage area 2002 of the second base station gNB2 and connected to the second base station gNB2 via the Uu interface.

Resource Allocations Modes

Currently, each UE using Mode 2 resource allocation performs first sensing and then resource selection based on the sensing results or else random selection.

During Release 16 V2X study item (SI) phase, the Mode 2 resource allocation was discussed with three sub-modes, which were later consolidated into the current definition of Mode 2 resource allocation. The definitions of the three sub-modes of Mode 2 will be briefly described in the following [2].

A first sub-mode is Mode 2a. In this sub-mode, the UE may autonomously select sidelink resources for transmission in the context of a semi-persistent scheme where resource(s) are selected for multiple transmissions of different transport blocks (TBs) and a dynamic scheme where resource(s) are selected for each TB transmission.

A second sub-mode is Mode 2c. According to the definition, a Mode 2(c) UE is (pre-) configured with single or multiple patterns for sidelink transmission. The pattern here means the position(s) and size of the resources in time and frequency, and the number of resources. In case of out of coverage scenario, a UE assumes a pre-configuration of single or multiple transmission patterns per resource pool. In case of in-coverage scenario, the gNB indicates via a configuration the transmission patterns for the UE per resource pool. For UE configured with single transmission pattern no sensing procedure is carried out while for a UE configured with multiple tranmissions, sensing is a possibility. This mode was ultimately not supported in Rel.16.

A third sub-mode is Mode 2d. The third subA UE provides sidelink configuration to other UE's in a group-based SL communication via higher layer signaling [2]. This functionality is up to the UE capability (ies). In context of group-cast based SL communication, UE-A (also referred to as group head or group lead(er) UE) can inform the gNB under whose coverage it is about the group members UE-B, UE-C, and so on. The gNB can provide individual resource pool configurations and/or individual resource configurations to each group member via UE-A. The UE-A has no capability to modify the resource configurations granted by the gNB and nor there is a direct association between any group member UE and gNB.

In Rel-16, Mode 2a was finally considered as Mode 2 for sidelink resource allocation.

Discovery of UEs

The sidelink discovery procedure per definition can be used by a UE capable to discover other UE(s) in proximity using E-UTRA direct radio signals via PC5. The UE can be either in-coverage or out-of-coverage. For an out of coverage scenario, only ProSe-enabled (ProSe=Proximity Service) Public safety UEs can perform sidelink discovery. Two models for discovery are defined in LTE [4], which will be briefly described in the following.

A first model for discovery defined in LTE [4] is Model A ("I am here"). This model defines two roles for the UEs, which are ProSe enabled and are participating in ProSe Direct Discovery.

Announcing UE: The UE that announces certain information that could be used by UEs in proximity that have permission to discover.

Monitoring UE: The UE that monitors certain information of interest in proximity of announcing UEs.

In this model, the announcing UE broadcasts discovery messages at pre-defined discovery intervals and the monitoring UEs, that are interested in these messages read them and process them.

A second model defined in LTE [4] is Model B ("who is there?"/"are you there?"). This model, when restricted discovery type is used, defines two roles for the ProSe-enabled UEs that are participating in ProSe Direct Discovery.

Discoverer UE: The UE that transmits a request containing certain information about what it is interested to discover.

Discoveree UE: The UE that receives the request message can respond with some information related to the discoverer's request.

It is equivalent to "who is there/are you there" since the discoverer UE sends information about other UEs that would like to receive responses from, e.g. the information can be about a ProSe Application Identity corresponding to a group and the members of the group can respond.

In view of the above, there is the need to enhance the resource selection/allocation procedure of UEs, in order to enhance the reliability and reduce the latency of UE communications.

It is noted that the information in the above section is only for enhancing the understanding of the background of the invention and therefore it may contain information that does not form prior art and is not already known to a person of ordinary skill in the art.

SUMMARY

According to an embodiment, a method for sharing resources between at least two transceivers of a wireless communication system, at least a first transceiver and a second transceiver of the at least two transceivers operating in a NR sidelink mode 2, in which resources for a sidelink communication over a sidelink are scheduled autonomously, may have the step of: reporting, by a first transceiver of the at least two transceivers, a set of resources to the second transceiver by transmitting an information describing the set of resources, determining, by the second transceiver, a set of candidate resources out of the resources of the sidelink, the set of candidate resources having at least a part of the set of resources reported by the first transceiver, performing, by the second transceiver, a sidelink transmission using selected resources selected out of the set of candidate resources, wherein the set of resources is determined at the first transceiver, wherein the set of resources is a set of not preferred resources which is not preferred for the sidelink transmission of the second transceiver.

Another embodiment may have a first transceiver of a wireless communication system, wherein the first transceiver is configured to operate in a NR sidelink mode 2, in which resources for a sidelink communication over a sidelink are scheduled autonomously by the first transceiver, wherein the first transceiver is configured to determine a set of resources and to report the set of resources to a second transceiver of the wireless communication system, wherein the set of resources is a set of not preferred resources which is not preferred for a sidelink transmission of the second transceiver.

Another embodiment may have a second transceiver of a wireless communication system, wherein the second transceiver is configured to operate in a NR sidelink mode 2, in which resources for a sidelink communication over a sidelink are scheduled autonomously by the second transceiver, wherein the second transceiver is configured to receive from a first transceiver of the wireless communication system an information describing a set of resources, wherein the set of resources is determined at the first transceiver, wherein the set of resources is a set of not preferred resources which is not preferred for a sidelink transmission of the second transceiver.

According to another embodiment, a method for operating a first transceiver of a wireless communication system may have the steps of: operating the first transceiver in a NR sidelink mode 2, in which resources for a sidelink communication over a sidelink are scheduled autonomously by the first transceiver, determining a set of resources and reporting the set of resources to a second transceiver of the wireless communication system, wherein the set of resources is a set of not preferred resources which is not preferred for a sidelink transmission of the second transceiver.

According to another embodiment, a method for operating a second transceiver of a wireless communication system may have the steps of: operating the second transceiver in a NR sidelink mode 2, in which resources for a sidelink communication over a sidelink are scheduled autonomously by the second transceiver, receiving from a first transceiver of the wireless communication system an information describing a set of resources, wherein the set of resources is determined at the first transceiver, wherein the set of resources is a set of not preferred resources which is not preferred for a sidelink transmission of the second transceiver.

Another embodiment may have a non-transitory digital storage medium having stored thereon a computer program for performing a method for operating a first transceiver of a wireless communication system, the method having the steps of: operating the first transceiver in a NR sidelink mode 2, in which resources for a sidelink communication over a sidelink are scheduled autonomously by the first transceiver, determining a set of resources and reporting the set of resources to a second transceiver of the wireless communication system, wherein the set of resources is a set of not preferred resources which is not preferred for a sidelink transmission of the second transceiver, when the computer program is run by a computer.

Another embodiment may have a non-transitory digital storage medium having stored thereon a computer program for performing a method for operating a second transceiver of a wireless communication system, the method having the steps of: operating the second transceiver in a NR sidelink mode 2, in which resources for a sidelink communication over a sidelink are scheduled autonomously by the second transceiver, receiving from a first transceiver of the wireless communication system an information describing a set of resources, wherein the set of resources is determined at the first transceiver, wherein the set of resources is a set of not preferred resources which is not preferred for a sidelink transmission of the second transceiver, when the computer program is run by a computer.

BRIEF DESCRIPTION OF THE DRAWINGS

Embodiments of the present invention are described herein making reference to the appended drawings, in which.

DETAILED DESCRIPTION OF THE INVENTION

Figure 1A:
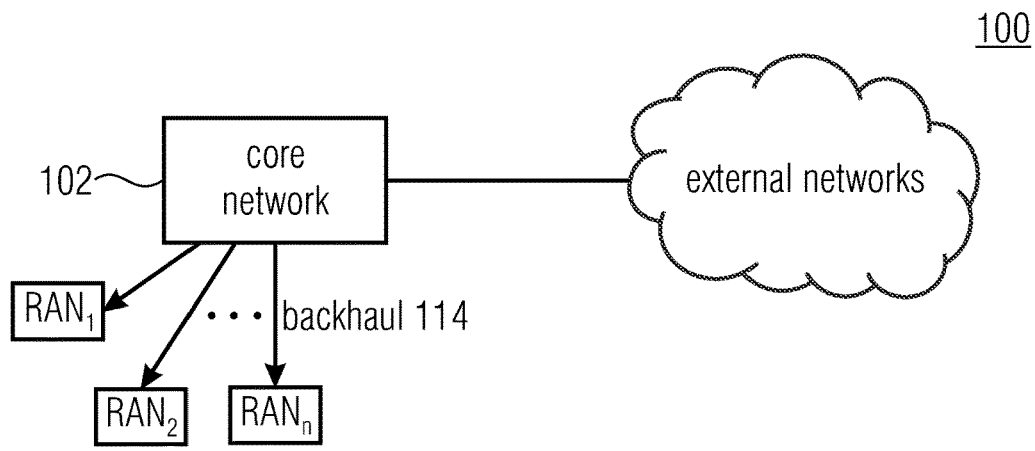
FIG. 1a-b shows a schematic representation of an example of a wireless communication system.
Figure 1B:
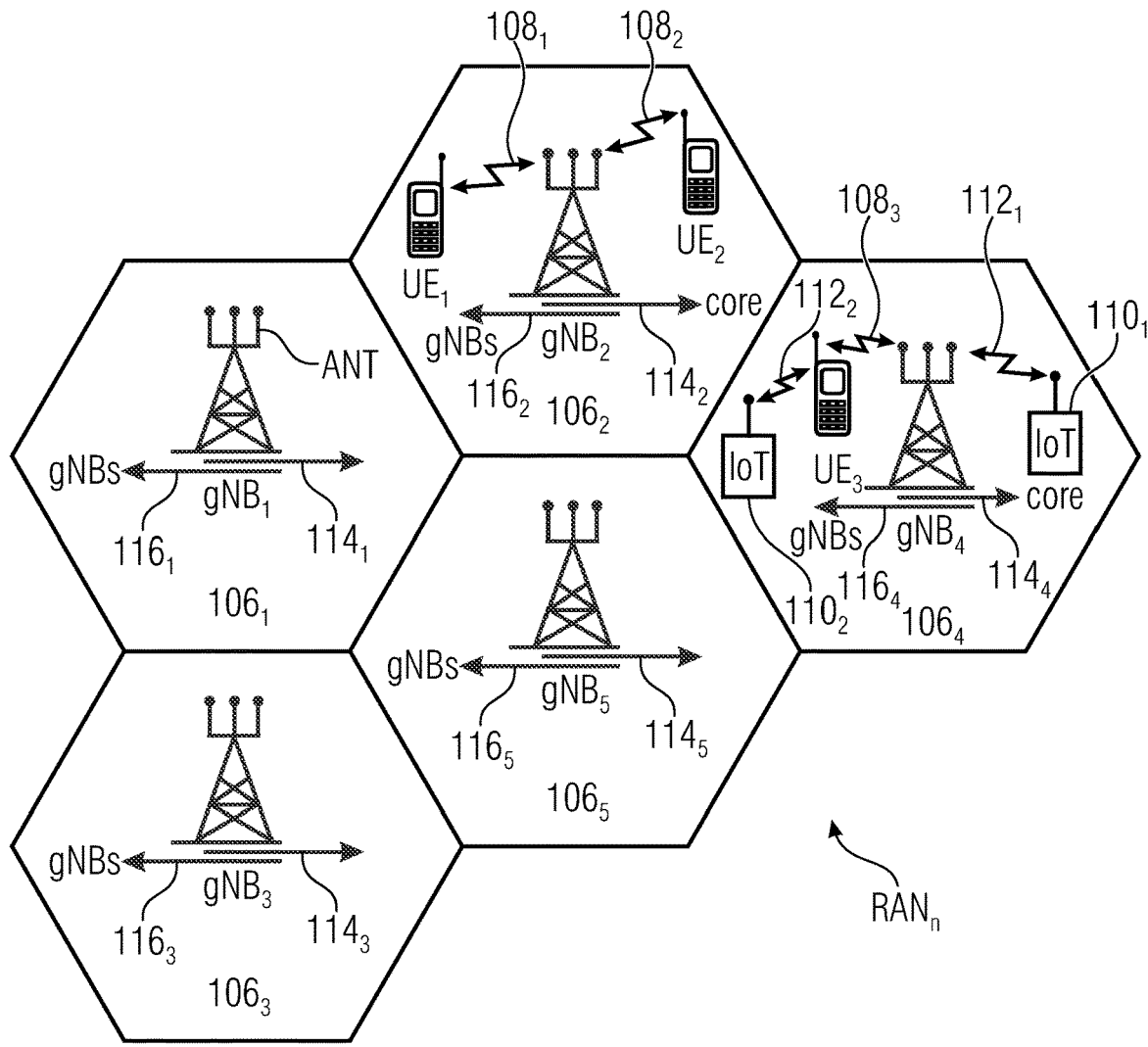
Figure 2:
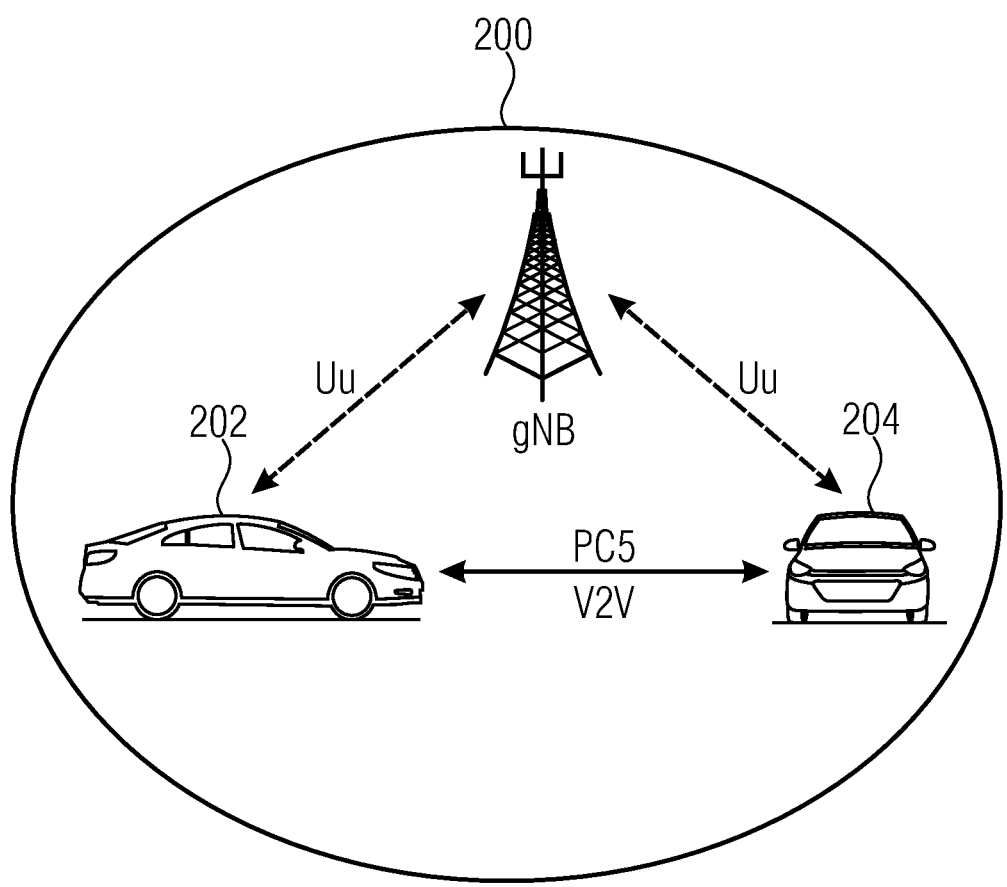
FIG. 2 is a schematic representation of an in-coverage scenario in which UEs directly communicating with each other are connected to a base station.
Figure 3:
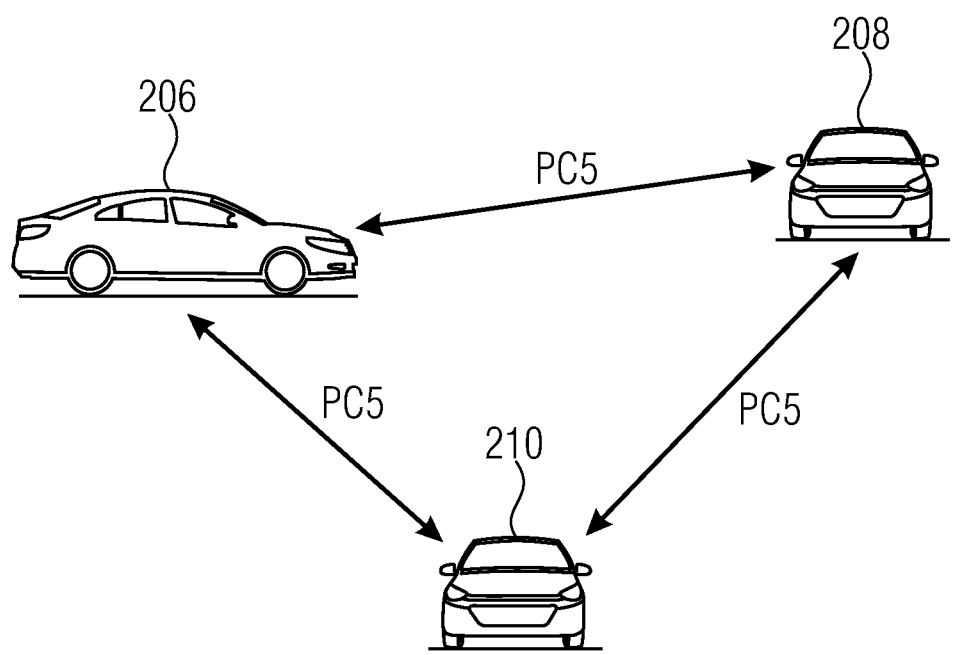
FIG. 3 is a schematic representation of an out-of-coverage scenario in which UEs directly communicating with each other receive no SL resource allocation configuration or assistance from a base station.
Figure 4:
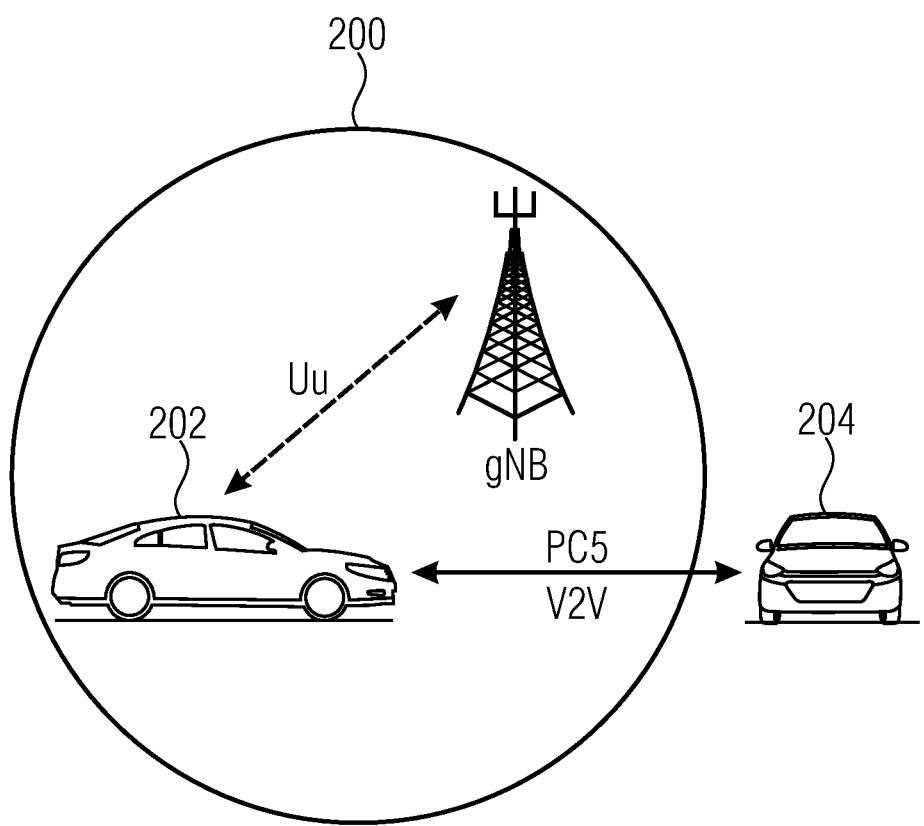
FIG. 4 is a schematic representation of a partial out-of-coverage scenario in which some of the UEs directly communicating with each other receive no SL resource allocation configuration or assistance from a base station.
Figure 5:
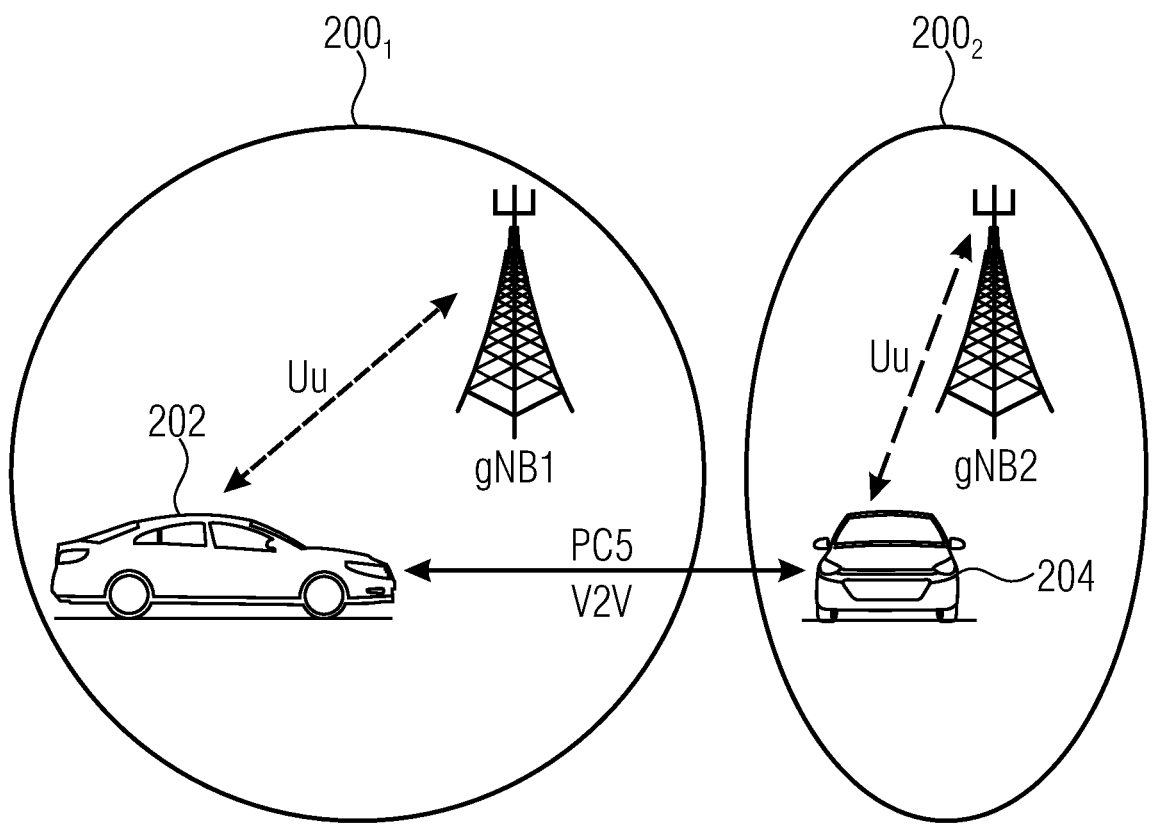
FIG. 5 is a schematic representation of an in-coverage scenario in which UEs directly communicating with each other are connected to different base stations.

Equal or equivalent elements or elements with equal or equivalent functionality are denoted in the following description by equal or equivalent reference numerals.

In the following description, a plurality of details are set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

Embodiments of the present invention relate to the issue of "Inter-UE coordination", which is to be discussed in the Rel-17 work item (WI) of NR sidelink [1]. The Inter-UE coordination is a resource allocation enhancement, where by definition, "a set of resources is determined at UE-A. This set is sent to UE-B in mode 2, and UE-B takes this into account in the resource selection for its own transmission".

Figure 6:
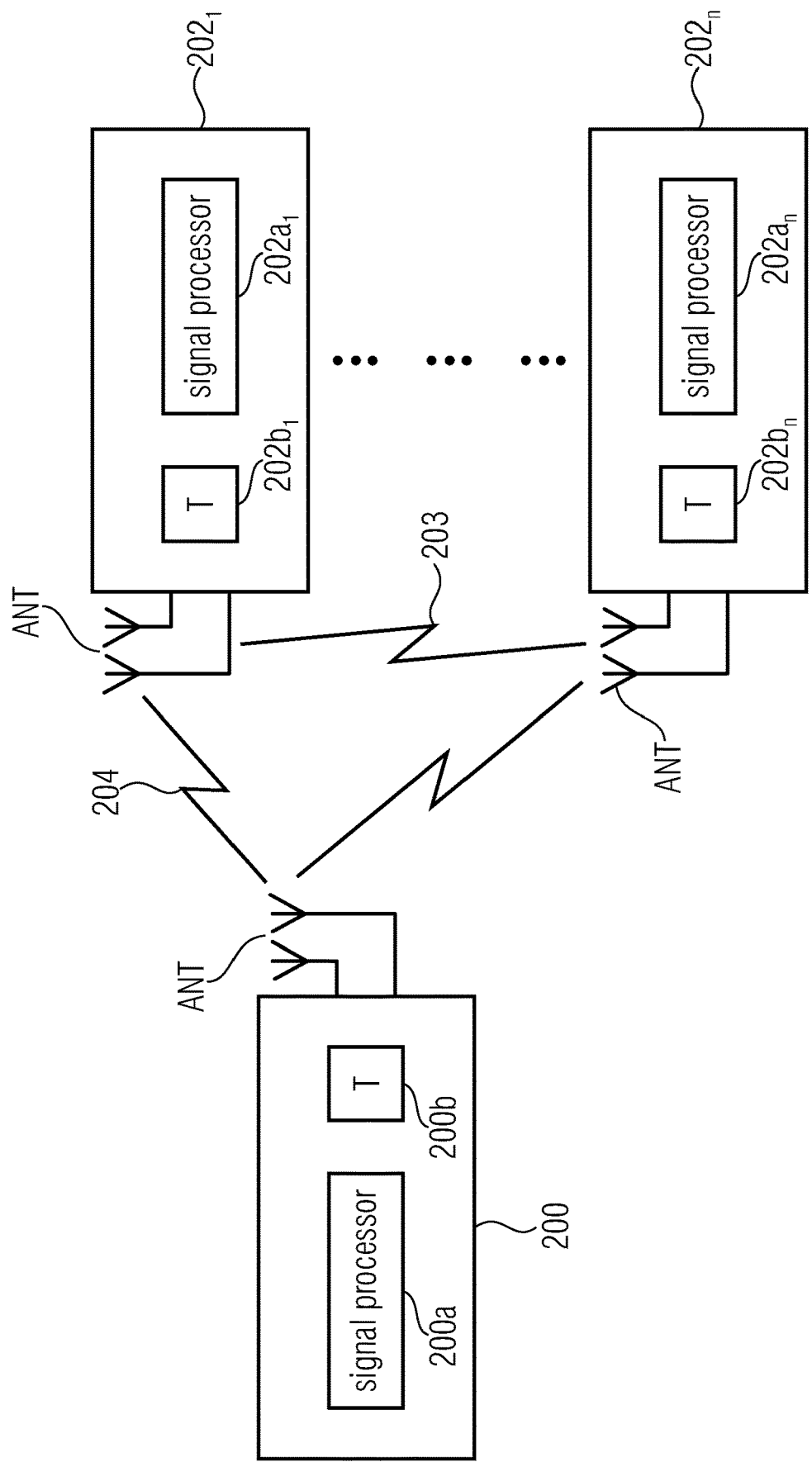
FIG. 6 is a schematic representation of a wireless communication system comprising a transceiver, like a base station or a relay, and a plurality of communication devices, like UEs.

Embodiments of the present invention may be implemented in a wireless communication system or network as depicted in FIGS. 1 to 5 including a transceiver, like a base station, gNB, or relay, and a plurality of communication devices, like user equipment's, UEs. FIG. 6 is a schematic representation of a wireless communication system comprising a transceiver 200, like a base station or a relay, and a plurality of communication devices $202_1$ to $202_n$, like UEs.

The UEs might communicated directly with each other via a wireless communication link or channel 203, like a radio link (e.g., using the PC5 interface (sidelink)). Further, the transceiver and the UEs 202 might communicate via a wireless communication link or channel 204, like a radio link (e.g., using the uU interface). The transceiver 200 might include one or more antennas ANT or an antenna array having a plurality of antenna elements, a signal processor 200a and a transceiver unit 200b. The UEs 202 might include one or more antennas ANT or an antenna array having a plurality of antennas, a signal processor $202a_1$ to $202a_n$, and a transceiver unit $202b_1$ to $202b_n$. The base station 200 and/or the one or more UEs 202 may operate in accordance with the inventive teachings described herein.

Embodiments provide a method for sharing unused resources between at least two transceivers [e.g., UE X and UE A] of a wireless communication system, at least a second transceiver [e.g., UE A] of the at least two transceivers operating in a sidelink in-coverage, out of coverage or partial coverage scenario [e.g., NR sidelink mode [e.g., mode 1 or mode 2] ], in which resources for a sidelink communication [e.g., transmission and/or reception] over a sidelink are pre-configured by the wireless communication system or scheduled autonomously by the second transceiver. The method comprises a step of reporting, by a first transceiver [e.g., UE X] of the at least two transceivers, a set of unused resources of the first transceiver to the second transceiver [e.g. by transmitting an information describing the set of unused resources]. Further, the method comprises a step of determining, by the second transceiver [e.g., UE A], a set of candidate resources out of the resources of the sidelink, the set of candidate resources comprising at least a part of the unused resources of the first transceiver. Further, the method comprises a step of performing, by the second transceiver, a sidelink transmission using selected resources selected out of the set of candidate resources.

In embodiments, the set of unused resources are a subset of an allocated set of resources, allocated to the first transceiver by the base station or allocated to the first transceiver autonomously by performing continuous or partial sensing of a first set of resources [e.g., a sub-channel, a resource pool or a bandwidth part] of the sidelink.

In embodiments, the unused resources are resources of a normal resource pool, a sidelink resource pool [e.g., shared mode 1 or mode 2 resource pool] or an exceptional pool.

In embodiments, determining, by the second transceiver, the set of candidate resources further comprises performing, by the second transceiver, continuous or partial sensing of a second set of resources [e.g., a sub-channel, a resource pool or a bandwidth part] of the sidelink, wherein the first set of resources and the second set of resources are the same sets of resources, different sets of resources or partially overlapping sets of resources contiguous or discontinuous in both time or frequency.

In embodiments, the unused resources of the first transceiver are reported periodically or in response to an external event [e.g., event triggered].

In embodiments, the set of unused resources of the first transceiver are reported to the second transceiver via a base station of the wireless communication system.

In embodiments, the second transceiver is operating in a sidelink in-coverage scenario [e.g., sidelink mode 2], wherein the set of unused resources are reported by the first transceiver by transmitting an uplink transmission from the first transceiver to the base station, the uplink transmission comprising an information [e.g., location of resources in terms of time and frequency or as bitmap] describing the set of unused resources, wherein the set of unused resources or a proper subset thereof are reported to the second transceiver by a multicast or broadcast transmission [e.g., SIB broadcast] from the base station to at least the second transceiver of the at least two transceivers, the multicast or broadcast transmission comprising an information [e.g., list of unused resources] describing the set of unused resources or the proper subset thereof.

In embodiments, the set of unused resources of the first transceiver are reported to the second transceiver further via a third transceiver [e.g., UE-D] of the wireless communication system.

In embodiments, the second transceiver is operating in an out-of-coverage scenario, wherein the set of unused resources are reported by the first transceiver by transmitting an uplink transmission from the first transceiver to the base station, the uplink signaling transmission comprising an information [e.g., location of resources in terms of time and frequency or as bitmap] describing the set of unused resources, wherein the set of unused resources or a proper subset thereof are reported to the third transceiver by a multicast or broadcast transmission [e.g., SIB broadcast] from the base station to at least the third transceiver of the at least two transceivers, the multicast or broadcast transmission comprising an information [e.g., list of unused resources] describing the set of unused resources or the proper subset thereof, wherein the set of unused resources or a proper subset thereof are reported to the second transceiver by a groupcast transmission from the third transceiver to at least the second transceiver by means of a groupcast or unicast transmission, the groupcast or unicast transmission comprising an information [e.g., list of unused resources] describing the set of unused resources or the proper subset thereof.

In embodiments, the method further comprises a step of selecting, by the second transceiver [e.g., UE A], resources out of the set of candidate resources for a sidelink transmission of the second transceiver, and of transmitting, by the second transceiver, the sidelink transmission in the selected resources, wherein unused resources of the set of unused resources of the first transceiver that are included in the set of candidate resources are considered in the selecting of resources for the sidelink transmission in dependence on at least one out of
- a distance between the first transceiver and the second transceiver,
- whether the first transceiver and the second transceiver are located in the same zone of the wireless communication system,
- a priority of priority threshold associated with the second transceiver or the sidelink transmission of the second transceiver,
- a battery level of the second transceiver,
- a signaling information received from the base station,
- a minimum communication range.

In embodiments, the set of unused resources of the first transceiver are reported directly to the second transceiver via a sidelink transmission, wherein the sidelink transmission from the first transceiver to the second transceiver comprises an information describing the set of unused resources of the first transceiver.

In embodiments, the sidelink transmission from the first transceiver to the second transceiver is a first stage system control information, SCI, transmission that comprises the information describing the set of unused resources of the first transceiver in a field.

In embodiments, the information describing unused resources of the first transceiver comprises an indicator [e.g., toggling bit] indicating a cancelation of previously reserved resources previously reserved by the first transceiver, thus updating the set of unused resources.

In embodiments, the method further comprises a step of performing, by the first transceiver, a further sidelink transmission from the first transceiver to the second transceiver, the further transmission indicating that the set of unused resources of the first transceiver or at least a proper subset thereof is not more available.

In embodiments, the further sidelink transmission from the first transceiver to the second transceiver is a second stage system control information, SCI, transmission.

In embodiments, the sidelink transmission is a second stage system control information, SCI, transmission that comprises the information describing the set of unused resources of the first transceiver in a field, wherein a first stage system control information, SCI, transmission preceding the second stage sidelink control information comprises an indicator, indicating the transmission of information describing the set of unused resources of the first transceiver in the second stage system control information, SCI, transmission.

In embodiments, the information describing the unused resources of the first transceiver comprises an indicator [e.g., toggling bit] indicating a cancelation of previously reserved resources previously reserved by the first transceiver, thus updating the set of unused resources.

In embodiments, the method further comprises a step of transmitting, by the second transceiver [e.g., UE A], a resource sharing request [e.g., sidelink transmission with a resource sharing request] from the second transceiver to the first transceiver [e.g., UE X], the resource sharing request requesting a sharing of the set of unused resources of the first transceiver, wherein the set of unused resources is reported by the first transceiver to the second transceiver in response to the resource sharing request.

In embodiments, the resource sharing request is transmitted from the second transceiver to the first transceiver by means of a dedicated control or data signaling, or a field in a first stage system control information, SCI.

In embodiments, the resource sharing request is transmitted from the second transceiver [e.g., UE A] to the first transceiver [e.g., UE X] in dependence on at least one out of
 a distance between the first transceiver and the second transceiver,
 that the first transceiver and the second transceiver are within a minimum communication range,
 that the first transceiver and the second transceiver are located in the same zone or within a group of nearby zones,
 that the first transceiver and the second transceiver belong to the combination of both TX-RX distance and zoneconfig and MCR.

In embodiments, the sidelink transmission describing the set of unused resources of the first transceiver is transmitted only from the first transceiver to the second transceiver, if at least one of the following conditions applies:
 a distance between the first transceiver and the second transceiver,
 that the first transceiver and the second transceiver are within a minimum communication range,
 that the first transceiver and the second transceiver are located in the same zone or within a group of nearby zones,
 that data to be transmitted by the second transceiver has a higher priority or higher quality of service, QoS, requirement than the data to be transmitted by the first transceiver,
 a measured RSSI value of a transmission from the second transceiver to the first transceiver is below a threshold [e.g., pre-defined threshold],
 a sidelink CSI-based procedure for the first transceiver to accept sharing the set of unused resources,
 a NACK of a hybrid automatic repeat request, HARQ, transmission is not received.

In embodiments, the sidelink transmission from the first transceiver to the second transceiver is sidelink discovery beacon transmission.

In embodiments, the sidelink transmission from the first transceiver to the second transceiver in a discovery channel.

In embodiments, the sidelink transmission from the first transceiver to the second transceiver comprising the information describing the set of unused resources of the first transceiver further comprises an information describing a time period [e.g., validity time] during which the set of unused resources can be used by the second transceiver or another transceiver.

In embodiments, the method further comprises transmitting, by the second transceiver, a resource sharing request from the second transceiver to the first transceiver [e.g., via a discovery type 2], the resource sharing request requesting a sharing of the set of unused resources of the first transceiver, wherein the method further comprises transmitting, by the first transceiver, a resource sharing answer from the first transceiver to the second transceiver, the resource sharing reply indicating an availability of a set of unused resources, wherein the method further comprises transmitting, by the second transceiver, a resource sharing acknowledgment from the first transceiver to the second transceiver, wherein the sidelink transmission with the information describing the set of unused resources is transmitted from the first transceiver to the second transceiver in response to the resource sharing request.

In embodiments, the second transceiver is a vulnerable road user equipment, VRU-UE [e.g., pedestrian UE or motorcycle UE], wherein the set of unused resources is reported directly to the vulnerable road user equipment or via a road side unit or a relay [e.g., L2 or L3].

In embodiments, the vulnerable road user equipment determines the set of candidate resources [e.g., to be reported to higher layers, e.g., MAC] out of the resources of the sidelink for the sidelink transmission of the second transceiver only based on the set of unused resources [e.g., the set of candidate resources is a subset of the set of unused resources] [e.g., and not based on sensing].

In embodiments, the set of unused resources is reported by the first transceiver to a group of transceivers of the wireless communication system, the group including the second transceiver, wherein the reporting of the set of unused resources is performed dedicatedly by means of a sidelink transmission [e.g., PC5-RRC] from the first transceiver to each transceiver of the group of transceivers, or wherein the reporting of the set of unused resources is performed by means of a groupcast or broadcast sidelink transmission to the group of transceivers, and/or wherein the reporting of the set of unused resources is performed in dependence on a DRX active period of the transceivers of the group of transceivers.

In embodiments, the set of unused resources are reported by the first transceiver in response to a congestion measurement.

In embodiments, the set of unused resources is predicted by the first transceiver resulting from a predicted out-of-coverage scenario, wherein the set of unused resources is reported by the first transceiver to the second transceiver in response to predicting the out-of-coverage scenario.

In embodiments, the set of unused resources is reported by the first transceiver to the second transceiver in response to a predicted handover.

In embodiments, the set of unused resources is reported by the first transceiver to the second transceiver in dependence on a quality of service, QoS, requirement of the first transceiver in a subsequent transmission period [e.g., subframe].

Further embodiments provide a method for sharing resources between at least two transceivers [e.g., UE X and UE A] of a wireless communication system, at least a second transceiver [e.g., UE A] of the at least two transceivers operating in a sidelink in-coverage, out of coverage or partial coverage scenario [e.g., NR sidelink mode [e.g., mode 1 or mode 2] ], in which resources for a sidelink communication [e.g., transmission and/or reception] over a sidelink are pre-configured by the wireless communication system or scheduled autonomously by the second transceiver. The method comprises a step of reporting, by a first transceiver [e.g., UE X] of the at least two transceivers, a set of resources to the second transceiver by transmitting an information [e.g., assistance information or coordination information] describing the set of resources,
determining, by the second transceiver [e.g., UE A], a set of candidate resources out of the resources of the sidelink, the set of candidate resources comprising at least a part of the set of resources reported by the first transceiver Further, the method comprises a step of performing, by the second transceiver, a sidelink transmission using selected resources selected out of the set of candidate resources.

In embodiments, the set of resources are at least one out of
a set of unused resources,
a set of available resources,
a set of preferred resources,
a set of not preferred resources.

In embodiments, the information describing the set of resources is one out of
the set of resources itself,
a sensing information [e.g., complete raw signal measurement or sensing report],
a resource map.

In embodiments, the set of resources reported from the first transceiver to the second transceiver includes are a set of resources selected by the first transceiver in dependence on a selection criterion [e.g., those resources, which are preferred for the sidelink transmission of the second transceiver or resources which are not to be used for the sidelink transmission of the second transceiver].

In embodiments, the information [e.g., assistance information or coordination information] describing the set of resources are transmitted from the first transceiver to the second transceiver via
a physical layer [e.g., long SCI format, short SCI format or in the first or second stage assistance information or coordination information message],
a higher layer [e.g., RRC message, PC5-RRC message or MAC CE].

In embodiments, the set of resources indicated by the information [e.g., assistance information or coordination information] are determined by the first transceiver by monitoring a number of resource pools in a bandwidth part, wherein the number of monitored resource pools are adaptively adjusted in dependence on a power consumption criterion.

In embodiments, the method further comprises transmitting from the first transceiver to the second transceiver or another transceiver of the wireless communication system an information [e.g., assisted information] describing the resource pools of the bandwidth part that are monitored by the first transceiver.

In embodiments, the information is transmitted via a second stage SCI format or a PC5-RRC message.

In embodiments, the method further comprises transmitting a contextual information from the first transceiver to the second transceiver, wherein the contextual information describes at least one out of
a set of preferred resources,
a set of not preferred resources.

In embodiments, the sidelink transmission is performed by the second transceiver using selected resources selected out of the set of candidate resources based on the set of preferred resources and/or the set of not preferred resources.

In embodiments, the contextual information is transmitted via a second SCI format indicated by a first SCI.

In embodiments, in case that the contextual information describes a set of preferred resources, those resources may be selected out of the set of candidate resources which coincide with the set of preferred resources, or wherein, in case that the contextual information describes a set of not preferred resources, those resources may be selected out of the set of candidate resources which differ from the set of not preferred resources.

In embodiments, the method further comprises a step of transmitting, with the first transceiver, a first reservation information indicating a reservation of one or more selected resources selected by the first transceiver for a first sidelink transmission, wherein the method further comprises a step of transmitting, with the second transceiver, a second reservation information indicating a reservation of one or more selected resources selected by the second transceiver for a second sidelink transmission, wherein the method further comprises a step of receiving, with a third transceiver, the first reservation information and the second reservation information and determining whether at least one reserved resource is reserved by both, the first reservation information and the second reservation information, wherein the method further comprises a step of transmitting, with the third transceiver, an assistance information or coordination information to the first transceiver or the second transceiver, wherein the assistance information or coordination information is configured to control the respective transceiver to pre-empt the at least one reserved resource.

In embodiments, the assistance information or coordination information is transmitted to either the first transceiver or the second transceiver in dependence on a priority, a quality of service parameter or another metric for the preemption selection indicated by the respective reservation information.

In embodiments, the first reservation information and the second reservation information are transmitted in the same slot.

Further embodiments provide a first transceiver of a wireless communication system, wherein the first transceivers is configured to operate in a sidelink in-coverage, out of coverage or partial coverage scenario [e.g., NR sidelink mode [e.g., mode 1 or mode 2] ], in which resources for a sidelink communication [e.g., transmission and/or reception] over a sidelink are pre-configured by the wireless communication system or scheduled autonomously by the first transceiver, wherein the first transceiver is configured to report a set of unused resources of the first transceiver to a second transceiver of the wireless communication system [e.g. by transmitting an information describing the set of unused resources].

Further embodiments provide a second transceiver of a wireless communication system, wherein the second transceiver is configured to operate in a sidelink in-coverage, out of coverage or partial coverage scenario [e.g., NR sidelink mode [e.g., mode 1 or mode 2] ], in which resources for a sidelink communication [e.g., transmission and/or reception] over a sidelink are pre-configured by the wireless communication system or scheduled autonomously by the second transceiver, wherein the second transceiver is configured to receive an information describing a set of unused resources of a first transceiver of the wireless communication system, wherein the second transceiver is configured to determine a set of candidate resources out of the resources of the sidelink, the set of candidate resources comprising at least a proper subset of the unused resources of the first transceiver, wherein the second transceiver is configured to perform a sidelink transmission using selected resources selected out of the set of candidate resources.

Further embodiments provide a wireless communication system, comprising a first transceiver and a second transceiver.

Further embodiments provide a method for operating a first transceiver of a wireless communication system. The method comprises a step of operating the first transceiver of the wireless communication system in a sidelink in-coverage, out of coverage or partial coverage scenario [e.g., NR sidelink mode [e.g., mode 1 or mode 2] ], in which resources for a sidelink communication [e.g., transmission and/or reception] over a sidelink are pre-configured by the wireless communication system or scheduled autonomously by the first transceiver. Further, the method comprises a step of reporting a set of unused resources of the first transceiver to a second transceiver of the wireless communication system [e.g. by transmitting an information describing the set of unused resources].

Further embodiments provide a method for operating a second transceiver of a wireless communication system. The method comprises a step of operating the second transceiver of the wireless communication system in a sidelink in-coverage, out of coverage or partial coverage scenario [e.g., NR sidelink mode [e.g., mode 1 or mode 2] ], in which resources for a sidelink communication [e.g., transmission and/or reception] over a sidelink are pre-configured by the wireless communication system or scheduled autonomously by the second transceiver. Further, the method comprises a step of receiving an information describing a set of unused resources from a first transceiver of the wireless communication system. Further, the method comprises a step of determining a set of candidate resources out of the resources of the sidelink, the set of candidate resources comprising at least a proper subset of the unused resources of the first transceiver. Further, the method comprises a step of performing a sidelink transmission using selected resources selected out of the set of candidate resources.

Embodiments allow for inter-UE coordination thereby to enhancing the resource allocation procedure existing for V2X. The motivation for this enhancement is w.r.t enhanced reliability and reduced latency in consideration of both PRR and PIR as defined in TR37.885.

In embodiments, the UE uses a dedicated set of resources for inter-UE coordination, which helps in improving the PRR and PIR by minimizing collision.

Further, in embodiments, the following aspect is being discussed with respect to Inter-UE coordination for UE's operating in in-coverage, partial coverage, and out-of-coverage:
1. How the UE A discovers and sends the determined resources, which are unused to UE-B(s) in mode 2?
   The L1/L2 and L3 signalling procedure to provide (schedule/assist) resources for transmission/reception for other UE's
      Which resources can be used to schedule/assist other UE's
   Discovery procedure for determining the UE-B(s) in the vicinity [both L1 & L2]

In embodiments, the inter-UE coordination broadly can be seen to encompass the initially defined sub-modes Mode 2a and Mode 2d where a UE, e.g. UE-A, is capable of sending its unused set of resources to another UE, e.g. UE-B. The unused set of resources can be a either the complete resources or a subset of resources determined resources at e.g. UE-A. If the problem of inter-UE coordination is seen from a Groupcast perspective, then even the SL follows a hierarchal set-up, i.e. a UE behaves as a local manager or group-head for UEs associated to this particular group. Therefore, in this case there is no need to discover the UEs to whom the resources need to be sent. On the contrary, if the UE is not associated to any group then UEs in the proximity can be identified via a discovery procedure similar to D2D communication [3] or based on geolocation information, e.g. minimum communication range in Rel-16 [2].

Hence, embodiments relate to discovering the UEs in the proximity and convey the already granted unused resources to other UE's. The UEs are assumed to be in Mode 2 (autonomous resource allocation), which can be operated in complete out of coverage, in-coverage or in partial coverage scenarios. Also, the resources which are identified as unused resources could be from a normal resource pool, a shared mode 1 and mode 2 resource pool or an exceptional pool.

In embodiments, L1 signaling mainly includes the enhancements in the control channels PSCCH and feedback channels PSFCH, i.e. SCI and feedback channel while taking into account the associated QoS and TX-RX distance given by the higher layers.

The procedures related to the exchange of resource information and which UEs to share this with is discussed in the following embodiments:
  Sidelink unused resource report and steps for UE's in Mode 2 in in-coverage where, all UEs are able to receive SIB in RRC_IDLE state/RRC_INACTIVE state.
  Enhancing the Sidelink Control Information for UE's in Mode 2 in out-of-coverage. Additionally, feedback channel enhancement for specific cases e.g. groupcast and unicast.
  Sidelink unused resource reporting for partial coverage Mode2.
  Discovery procedure for identifying which UEs to share the unused resources dedicatedly.
  UE-UE signaling procedure in case of Pedestrians.
  Inter-UE coordination specific to Groupcast scenario.
  Additional triggering conditions for the procedures
  Subsequently, embodiment of the present invention are described in further detail.

Embodiment 1: Unused Resource Reporting Via the Base Station and Control Channel This embodiment discusses the reporting procedure on how to exchange unused resources at a first transceiver (e.g., UE-X) with UEs in the proximity, e.g., a second transceiver (e.g., UE-A) and a third transceiver (e.g., UE-B) in case of in-coverage, out-of-coverage or partial-coverage. The following options stated below cover examples of different possible options w.r.t the reporting procedure.

Thereby, note that herein the UE that has unused or unused resources available is called first transceiver (e.g., UE-X). In case of groupcast communication, this UE could act as a group head/group lead of the group, e.g., the group head in a platoon. UEs demanding resources are referred to as second transceiver (e.g., UE-A), third transceiver (e.g., UE-B), fourth transceiver (e.g., UE-C), and so on.

Option 1: All UEs in Coverage

In this option, the signaling aspect of a transceiver (e.g., UE) willing to offer its unused resources to a single transceiver (e.g., UE) or multiple transceivers (e.g., UEs) is discussed for Mode 2 in-coverage.

Figure 7:
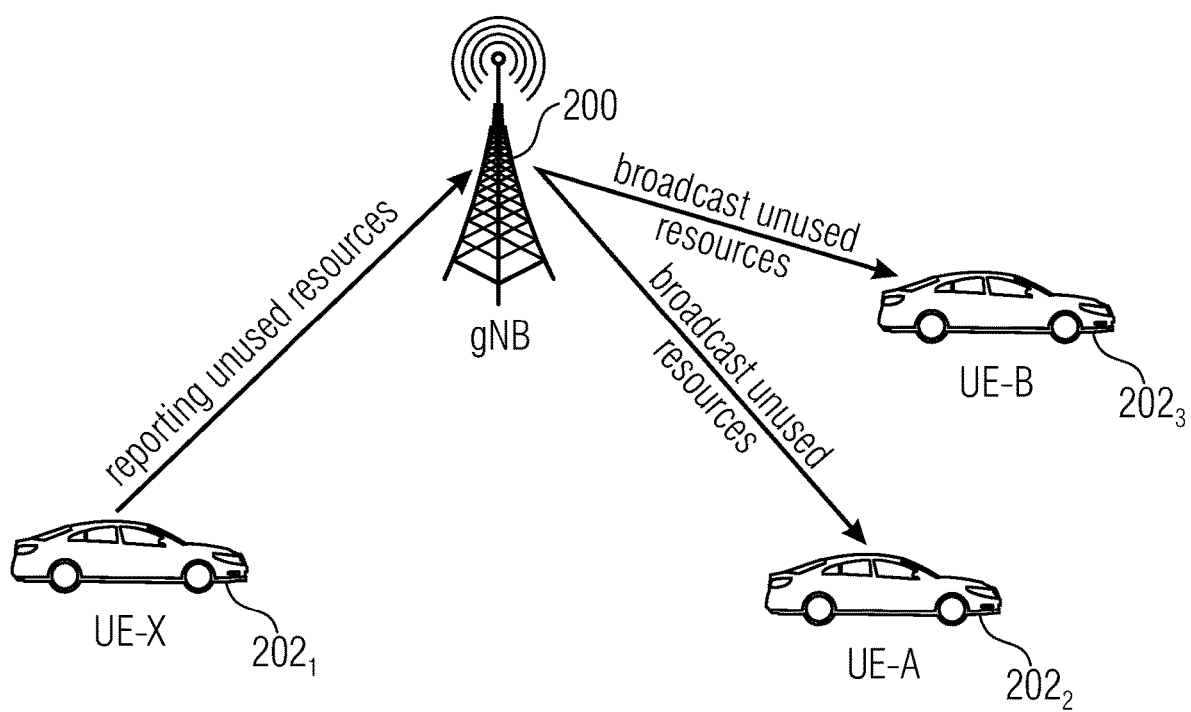
FIG. 7 is a schematic representation of a wireless communication system with a first transceiver, a second transceiver and a third transceiver, which are in-coverage of a base station of the wireless communication system.

FIG. 7 is a schematic representation of a wireless communication system with a first transceiver $202_1$ (UE-X), a second transceiver $202_2$ (UE-A) and a third transceiver $202_3$ (UE-B), which are in-coverage of a base station 200 (gNB) of the wireless communication system. The first transceiver $202_1$ (UE-X) is configured to report a set of unused resources to the second transceiver $202_2$ (UE-B) and optionally to the third transceiver $202_3$ (UE-B) via the base station 200 (gNB), for example, by transmitting an information describing the set of unused resources. In other words, FIG. 7 shows an illustrative view of an example of an in-coverage scenario, in which the second transceiver (e.g., UE-A) and the third transceiver (e.g., UE-B) are in Mode 2 and the first transceiver (e.g., UE-X) is in Model.

To summarize the steps as shown in FIG. 7, a first transceiver (e.g., UE-X) has unused resources granted to it. This could be the case due to periodically reserved resources, which are not needed for a given period. It reports these unused resources to the base station (e.g., gNB), which then broadcasts this resource set, for example, via the SIB, to the transceivers (e.g., UEs) in proximity of the first transceiver (e.g., UE-X). This reporting by the first transceiver (e.g., UE-X) can be event-triggered.

Subsequently, the different steps of reporting the unused resources from the first transceiver to at least a second transceiver are described in further detail.

In embodiments, in a first step (Step 1), the first transceiver (e.g., UE-X) may have identified a set of resources for its existing service(s), e.g., via sensing or granted by the base station (e.g., gNB) and has some additional unused resource(s) available. The transceiver (e.g., UE-X) reports its unused resources to the base station (e.g., gNB) via dedicated signaling. The unused resources can be reported, for example, as the location of the resource elements in terms of time and frequency or as a bitmap, with periodicity or a validity time, optionally along with the geo-location (e.g., MCR/TX-RX distance or zone id) and speed of the transceiver (e.g., UE-X). Also, one additional criteria for triggering this report could be a QoS based threshold, e.g., priority (e.g., similar to thresSL-TxPrioritization) could be transmitted, allowing only the transceiver (e.g., UE-X) when exceeding this threshold to report this unused resources. This report of unused resources can either be a new information element, IE, within the RRC or this information could be appended to the UE-Assistance [5]. The example of a corresponding information element is shown below. The base station (e.g., gNB) could use, for example, the information available from Release 15 sensing report granting resources to the UEs in mode 1.

Specifically, the example of the corresponding SL Measurement Reporting [5] Information Element, IE, could be as follows. Thereby, in the below example, elements being highlighted in yellow may be provided, modified or changed according to the inventive approach described herein.

```
MeasResultSensing-r15   ::= SEQUENCE {
sl-SubframeRef-r15      INTEGER (0..10239),
sensingResult-r15       SEQUENCE (SIZE (0..400)) OF SensingResult-r15
}
SensingResult-r15 ::= SEQUENCE {
resourceIndex-r15       INTEGER (1..2000)
}
UnusedResourceIndex :: = SEQUENCE{
UnusedresourceIndex-r17    INTEGER(1...X) OPTIONAL
}
```

In embodiments, in a second step (Step 2), the base station (e.g., gNB) may then broadcast the identified resources in Step 1 to the transceivers (e.g., UEs (e.g., UE-A and/or UE-B)) via the SIB X. For example, this broadcasted message contains list of unused resources (e.g., v2x-CommunusedResources in the SIBX) of the offered unused resources by the transceiver (e.g., UE-X) (which is deduced based on the speed and geolocation by the base station, e.g. gNB) along with the MCR and the time frequency location of the resources.

An example of the corresponding SystemInformationBlockTypeX [5] Information Element, IE, could be as follows. Thereby, in the below example, elements being highlighted in yellow may be provided, modified or changed according to the inventive approach described herein.

```
-- ASN1START
SystemInformationBlockType21-r14 ::= SEQUENCE {
    sl-V2X-ConfigCommon-r14         SL-V2X-ConfigCommon-r14
    OPTIONAL, -- Need OR
    lateNonCriticalExtension        OCTET STRING                OPTIONAL,
    ...
}
SL-V2X-ConfigCommon-r14 ::=     SEQUENCE {
    v2x-CommRxPool-r14              SL-CommRxPoolListV2X-r14
```

```
                OPTIONAL,  -- Need OR
  v2x-CommTxPoolNormalCommon-r14        SL-CommTxPoolListV2X-r14
                OPTIONAL,  -- Need OR
  p2x-CommTxPoolNormalCommon-r14        SL-CommTxPoolListV2X-r14
                OPTIONAL,  -- Need OR
  v2x-CommTxPoolExceptional-r14         SL-CommResourcePoolV2X-r14
                OPTIONAL,  -- Need OR
  v2x-SyncConfig-r14                    SL-SyncConfigListV2X-r14              OPTIONAL,
     -- Need OR
  v2x-InterFreqInfoList-r14             SL-InterFreqInfoListV2X-r14           OPTIONAL,
     -- Need OR
  v2x-ResourceSelectionConfig-r14       SL-CommTxPoolSensingConfig-r14
                OPTIONAL,  -- Need OR
  zoneConfig-r14                        SL-ZoneConfig-r14                     OPTIONAL, --
  Need OR
  typeTxSync-r14                        SL-TypeTxSync-r14
                OPTIONAL,  -- Need OR
  thresSL-TxPrioritization-r14  SL-Priority-r13                               OPTIONAL,
  Need OR
  anchorCarrierFreqList-r14             SL-AnchorCarrierFreqList-V2X-r14      OPTIONAL, --
  Need OR
  offsetDFN-r14                         INTEGER (0..1000)                     OPTIONAL, --
  Need OR
  cbr-CommonTxConfigList-r14            SL-CBR-CommonTxConfigList-r14
                OPTIONAL   -- Need OR
  }
  -- ASN1STOP
```

In accordance with embodiments, this can be adapted to a future release SIB, e.g., SIBX, where SIBX contains configurations of V2X sidelink communication defined in TS 36.331 [5].

An example of the corresponding SIBX information element—extension of SystemlnformationBlockTypeX information element in [6] could be as follows. Thereby, in the below example, elements being highlighted in yellow may be provided, modified or changed according to the inventive approach described herein.

Another option is that transceivers (e.g., UEs) that have the same zone, i.e., TX-RX distance as described in Rel.16 could consider these offered resources.

Optionally, depending on the associated priority or priority threshold (higher/equal), the transceivers (e.g., UEs) in the proximity could utilize these unused resources for their resource selection.

Optionally, the transceivers (e.g., UEs) are continuing their sensing procedure and take into account the received unused resources in their own resource selec-

```
  -- ASN1START
  -- TAG-SIBY-START
  SIBY-r16 ::=              SEQUENCE {
  sl-V2X-ConfigCommon-r16          OCTET STRING,
  sl-Bandwidth-r16          OCTET STRING,
  tdd-Config-r16            OCTET STRING,
  lateNonCriticalExtension         OCTET STRING      OPTIONAL,
  sl-V2XUnusedResources            OCTET STRING        OPTIONAL,
  }
  -- TAG-SIBY-STOP
  -- ASN1STOP
```

Thereby, the sl-V2X-ConfigCommon-r16 contains the configurations of previous releases.

In accordance with embodiments, a third step (Step 3) describes which transceivers (e.g., UEs) can consider the SIB's information and thereby use this list of unused resources. Transceivers (e.g., UE's) here are assumed to be in RRC-idle, RRC-inactive or RRC-active state. Some possible options are:

The transceivers (e.g., UEs) use this TX-RX distance calculation, i.e., sidelink relative position in order to decide if the resource is allowed to be considered by them or not. This is assuming that transceivers (e.g., UEs) are aware of each other location for example via the V2X messages like, CAM or DENM.

tion as per the IE SL-CommTxPoolSensingConfig. The IE SL-CommTxPoolSensingConfig specifies V2X sidelink communication configurations used for UE autonomous resource selection, see e.g. below. Alternatively, transceivers (e.g., UEs), may refrain from sensing or switch to partial sensing to e.g. to save battery power.

An example of the corresponding SL-CommTxPoolSensingConfig information element [5] could be as follows. Thereby, in the below example, elements being highlighted in yellow may be provided, modified or changed according to the inventive approach described herein.

```
-- ASN1START
SL-CommTxPoolSensingConfig-r14 ::=         SEQUENCE {
   pssch-TxConfigList-r14                  SL-PSSCH-TxConfigList-r14,
   thresPSSCH-RSRP-List-r14                      SL-ThresPSSCH-RSRP-List-r14,
   restrictResourceReservationPeriod-r14 SL-RestrictResourceReservationPeriodList-r14
OPTIONAL,         -- Need OR
   probResourceKeep-r14                    ENUMERATED {v0, v0dot2, v0dot4, v0dot6, v0dot8,
                                                 spare3,spare2, spare1},
   UnusedResourceList-r*                   SEQUENCE (SIZE (1..maxSL-TxPool-r*)) OF SL
TxPoolIdentity-r*
   p2x-SensingConfig-r14                   SEQUENCE {
      minNumCandidateSF-r14                      INTEGER (1..13),
      gapCandidateSensing-r14                    BIT STRING (SIZE (10))
   }     OPTIONAL,      -- Need OR
   sl-ReselectAfter-r14                    ENUMERATED {n1, n2, n3, n4, n5, n6, n7, n8, n9,
                                                 spare7, spare6, spare5, spare4, spare3,
spare2,
                                                 spare1}         OPTIONAL -- Need
OR
}
-- ASN1STOP
```

Another possibility could be that the base station (e.g., gNB) provides a dedicated configuration to the UE(s), e.g., in SPS like, Configured grant type 1 to let the transceiver(s) (e.g., UE(s)) utilize the unused resources for their resource via the resource pool configuration (IE SL-ResourcePool) itself. This also includes the duration for how long these resources are configured to be used by the transceiver(s) (e.g., UE(s)).

An example of the corresponding SL-ResourcePool information element [6] could be as follows. Thereby, in the below example, elements being highlighted in yellow may be provided, modified or changed according to the inventive approach described herein.

```
-- ASN1START
-- TAG-SL-RESOURCEPOOL-START
SL-ResourcePool-r16 ::=                    SEQUENCE {
   sl-PSCCH-Config-r16                        SetupRelease { SL-PSCCH-Config-r16 }
OPTIONAL, -- Need M
   sl-PSSCH-Config-r16                        SetupRelease { SL-PSSCH-Config-r16 }
OPTIONAL, -- Need M
   sl-PSFCH-Config-r16                        SetupRelease { SL-PSFCH-Config-r16 }
OPTIONAL, -- Need M
   sl-SyncAllowed-r16                      SL-SyncAllowed-r16
OPTIONAL, -- Need M
   sl-SubchannelSize-r16                      ENUMERATED {n10, n15, n20, n25, n50, n75,
n100}         OPTIONAL, -- Need M
   sl-Period-r16                           ENUMERATED {ffs}
OPTIONAL, -- Need M
   sl-TimeResource-r16                        ENUMERATED {ffs}
OPTIONAL, -- Need M
   sl-StartRB-Subchannel-r16                     INTEGER (0..265)
OPTIONAL, -- Need M
   sl-NumSubchannel-r16                       INTEGER (1..27)
OPTIONAL, -- Need M
   sl-MCS-Table-r16                           ENUMERATED {qam64, qam256, qam64LowSE}
OPTIONAL, -- Need M
   sl-ThreshS-RSSI-CBR-r16                       INTEGER (0..45)
OPTIONAL, -- Need M
   sl-TimeWindowSizeCBR-r16                         ENUMERATED {ms100, slot100}
OPTIONAL, -- Need M
   sl-TimeWindowSizeCR-r16                          ENUMERATED {ms1000, slot1000}
OPTIONAL, -- Need M
   sl-PTRS-Config-r16                      SL-PTRS-Config-r16
OPTIONAL, -- Need M
   sl-ConfiguredGrantConfigList-r16                 SL-ConfiguredGrantConfigList-r16
OPTIONAL, -- Need M
   sl-UE-SelectedConfigRP-r16                    SL-UE-SelectedConfigRP-r16
OPTIONAL, -- Need M
   sl-RxParametersNcell-r16                   SEQUENCE {
      sl-TDD-Config-r16                    TDD-UL-DL-ConfigCommon
OPTIONAL,
      sl-SyncConfigIndex-r16                  INTEGER (0..15)
   }                                                           OPTIONAL, -
- Need M
   sl-ZoneConfigMCR-List-r16                     SEQUENCE (SIZE (16)) OF SL-
ZoneConfigMCR-r16                     OPTIONAL, -- Need M
   ...
}
```

```
SL-ZoneConfigMCR-r16 ::=                SEQUENCE {
    sl-ZoneConfigMCR-Index-r16              INTEGER (0..15),
    sl-TransRange-r16                       ENUMERATED {m20, m50, m80, m100,
m120, m150, m180, m200, m220, m250, m270, m300, m350,
                                                                        m370, m400,
m420, m450, m480, m500, m550, m600, m700, m1000, spare8, spare7, spare6,
                                                                        spare5,
spare4, spare3, spare2, spare1}         OPTIONAL, -- Need M
    sl-ZoneConfig-r16                       SL-ZoneConfig-r16
OPTIONAL, -- Need M
    ...
}
SL-SyncAllowed-r16 ::=      SEQUENCE {
    gnss-Sync-r16               ENUMERATED {true}                  OPTIONAL, -
- Need R
    gnbEnb-Sync-r16             ENUMERATED {true}                  OPTIONAL,
-- Need R
    ue-Sync-r16             ENUMERATED {true}                      OPTIONAL. --
Need R
}
SL-PSCCH-Config-r16 ::=             SEQUENCE {
    sl-TimeResourcePSCCH-r16            ENUMERATED {n2, n3}
OPTIONAL, -- Need M
    sl-FreqResourcePSCCH-r16            ENUMERATED {n10,n12, n15, n20, n25}
OPTIONAL, -- Need M
    sl-DMRS-ScreambleID-r16         INTEGER (0..65535)
OPTIONAL, -- Need M
    sl-Num ReservedBits-r16         INTEGER (2..4)
OPTIONAL, -- Need M
    ...
}
SL-PSSCH-Config-r16 ::=             SEQUENCE {
    sl-PSSCH-DMRS-TimePattern-r16           ENUMERATED {ffs}
OPTIONAL, -- Need M
    sl-BetaOffsets2ndSCI-r16            SEQUENCE (SIZE (4)) OF SL-BetaOffsets-r16
OPTIONAL, -- Need M
    sl-Scaling-r16              ENUMERATED {f0p5, f0p65, f0p8, f1}
OPTIONAL, -- Need M
    ...
}
SL-PSFCH-Config-r16 ::=             SEQUENCE {
    sl-PSFCH-Period-r16                 ENUMERATED {sl0, sl1, sl2, sl4}
OPTIONAL, -- Need M
    sl-PSFCH-RB-Set-r16             BIT STRING (SIZE (275))
OPTIONAL, -- Need M
    sl-NumMuxCS-Pair-r16                ENUMERATED {n1, n2, n3, n4, n6}
OPTIONAL, -- Need M
    sl-MinTimeGapPSFCH-r16              ENUMERATED {sl2, sl3}
OPTIONAL, -- Need M
    sl-PSFCH-HopID-r16              INTEGER (0..1023)
OPTIONAL, -- Need M
    ...
}
SL-PTRS-Config-r16 ::=      SEQUENCE
    sl-PTRS-FreqDensity-f16         SEQUENCE (SIZE (2)) OF INTEGER (1..276)
OPTIONAL, -- Need M
    sl-PTRS-TimeDensity-r16         SEQUENCE (SIZE (3) OF INTEGER (0..29)
OPTIONAL, -- Need M
    sl-PTRS-RE-Offset-r16           ENUMERATED (offset01, offset10, offset11}
OPTIONAL, -- Need M
    ...
}
SL-UE-SelectedConfigRP-r16 ::=      SEQUENCE {
    sl-CBR-Priority-TxConfigList-r16        SL-CBR-Priority-TxConfigList-r16
OPTIONAL, -- Need M
    sl-ThresPSSCH-RSRP-List-r16         SL-ThresPSSCH-RSRP-List-r16
OPTIONAL, -- Need M
    sl-MultiReserveResource-r16         ENUMERATED {enabled}
OPTIONAL, -- Need M
    sl-MaxNumPerReserve-r16             ENUMERATED {n2, n3}
OPTIONAL, -- Need M
    sl-SensingWindow-r16            ENUMERATED {ms100, ms1100}
OPTIONAL, -- Need M
    sl-SelectionWindow-r16          ENUMERATED {n1, n5, n10, n20}
OPTIONAL, -- Need M
    sl-ResourceReservePeriodList-r16        SEQUENCE (SIZE (1..16)) OF SL-
ResourceReservePeriod-r16   OPTIONAL, -- Need M
    sl-RS-ForSensing-r16            ENUMERATED {pscch, pssch},
    Sl-UnusedResourceList-r*            SEQUENCE (SIZE (1..maxSL-TxPool-r*)) OF SL
```

```
TxPoolIdentity-r*
OPTIONAL,
    Sl-ResourceUnusedPeriod-r*           ENUMERATED {s0, s100, s200, s300, s400,
s500, s600, s700, s800, s900, s1000}
OPTIONAL,
-- period until periodical unused resources are avaialble
    Sl-ResourceUnusedFlag-r*             ENUMERATED {enabled}
OPTIONAL,
--if set to "enabled": resources avalalble, il set to "disabled" stop resource sharing
}
SL-ResourceReservePeriod-r16 ::=         ENUMERATED {s0, s100, s200, s300, s400,
s500, s600, s700, s800, s900, s1000}
SL-BetaOffsets-r16 ::=       INTEGER (0..31)
-- TAG-SL-RESOURCEPOOL-STOP
-- ASN1STOP
```

Note that SI-ResourceUnusedFlag-r* refers to the one bit in out of coverage to stop offering resources.

In accordance with embodiments a fourth step (Step 4) will happen anytime these unused resources being utilized in resource selection in Step 3 are needed back by the first transceiver (e.g., UE-X) that offered them in the first place. This condition might arise for the transceiver (e.g., UE-X) in case of event-triggered traffic that arrives in its buffer, e.g., a high QoS message such as emergency notification. In this case, the first transceiver (e.g., UE-X) can pre-empt the current transmission on its set of offered resources to other transceivers (e.g., UEs), for example, as in [9].

Option 2: UEs in Coverage and Out of Coverage (Partial Coverage)

This option discusses the scenario as example when one or a more transceivers (e.g., UEs) are in an in-coverage of the base station, e.g. gNB, and rest of transceivers (e.g., UEs) are in an out of coverage scenario. Then how should the transceivers (e.g., UEs) exchange the unused resources with the transceivers (e.g., UEs) in-coverage, or out-of-coverage or vice versa. For example, the first transceiver (e.g., UE-X) could be out-of-coverage, while the second transceiver (e.g., UE-A) could be in coverage.

For the procedure exemplarily described in the following, the first transceiver (e.g., UE-X) is assumed to be in in-coverage of the base station (e.g., gNB) while the transceivers (e.g., UEs) in the proximity are in Mode 2 (e.g., Mode 2 in-coverage and out-of-coverage). It is possible that during mobility only one transceiver (e.g., UE) or a group of transceivers (e.g., UEs) come under the base station (e.g., gNB) coverage while the other transceivers (e.g., UEs) still remain in out of coverage, e.g., as shown in FIG. 8.

Figure 8:
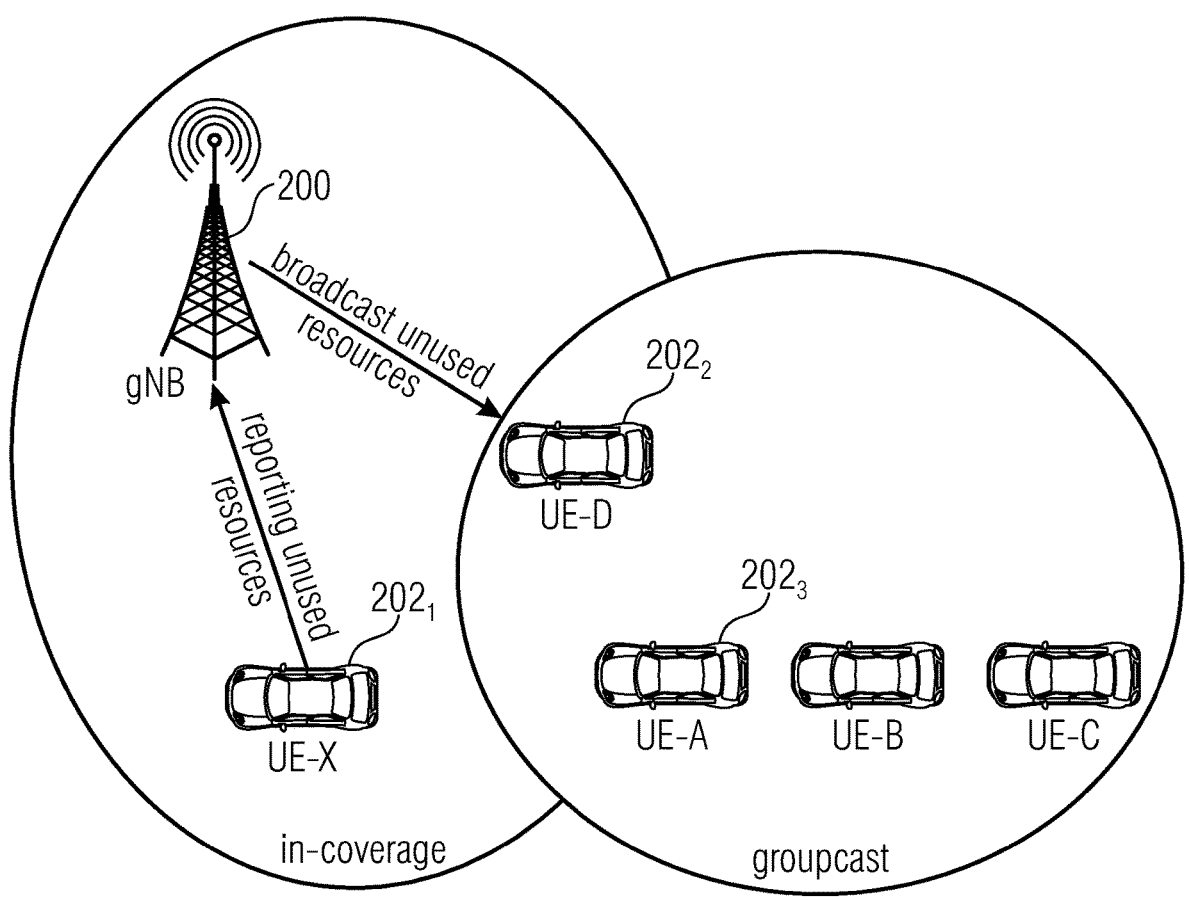
FIG. 8 is a schematic representation of a wireless communication system with a first transceiver, a second transceiver and at least a third transceiver, wherein the first transceiver and the second transceiver are in-coverage the base station, wherein at least the third transceiver is out-of-coverage the base station.

Specifically, FIG. 8 shows a schematic representation of a wireless communication system with a first transceiver $202_1$ (UE-X), a second transceiver $202_2$ (UE-D) and at least a third transceiver $202_3$ (UE-A), wherein the first transceiver $202_1$ (UE-X) and the second transceiver $202_2$ (UE-D) are in-coverage the base station 200 (gNB), wherein at least a third transceiver $202_3$ (UE-A) is out-of-coverage the base station 200 (gNB). In that case, the first transceiver $202_1$ (UE-X) can be configured to report a set of unused resources to the second transceiver $202_2$ (UE-D) via the base station 200 (gNB), for example, by transmitting an information describing the set of unused resources, wherein the second transceiver $202_2$ (UE-D) can be configured to directly report the set of unused resources at least to the third transceiver $202_3$ (UE-A) via the sidelink. In other words, FIG. 8 shown an illustrative view of an example of a Partial Coverage scenario in a groupcast case. Here, the second transceiver (e.g., UE-D) either broadcasts the resources received to the entire group via the control channel or it sends specifically via unicast link to a particular group-member.

The broadcasting of the unused resources can be seen as an event-triggered reporting. Depending on the service and the QoS to be supported, the first transceiver (e.g., UE-X), for example, can decide when it wants to start such a reporting mechanism. Now, if the first transceiver (e.g., UE-X) wants to forward the list of unused resources to a dedicated transceiver (e.g., UE) or a group of transceivers (e.g., UEs) then additional information can be appended to the sensing report, for example, similar to Release 15 sensing report. Then as seen in FIG. 8, the second transceiver (e.g., UE-D) can then send this unused resources to other transceivers (e.g., UE's, i.e., UE-A, UE-B, UE-C), for example, via a control channel. One exemplary way could be to send these unused resources via an index, like the destination ID in the second or first stage SCI. Additionally, as explained in the FIG. 8, the second transceiver (e.g., UE-D) can send either as unicast to particular transceiver (e.g., UE) or as broadcast to the entire group.

The example of a corresponding information element as explained in option 1, Step 1 can be re-used here.

Embodiment 2: Unused Resource Announcement Via Control Channel

In this embodiment, an example procedure for forwarding or providing unused resources of the first transceiver (e.g., UE-X) to transceivers (e.g., UEs) in proximity in case of Mode 2 via a control channel is discussed. A first transceiver (e.g., UE-X) that has unused resources (e.g., which are pre-configured) available could provide them to other transceivers (e.g., UEs), for example via an announcement procedure, i.e., Option 1 in FIG. 9.

Figure 9:
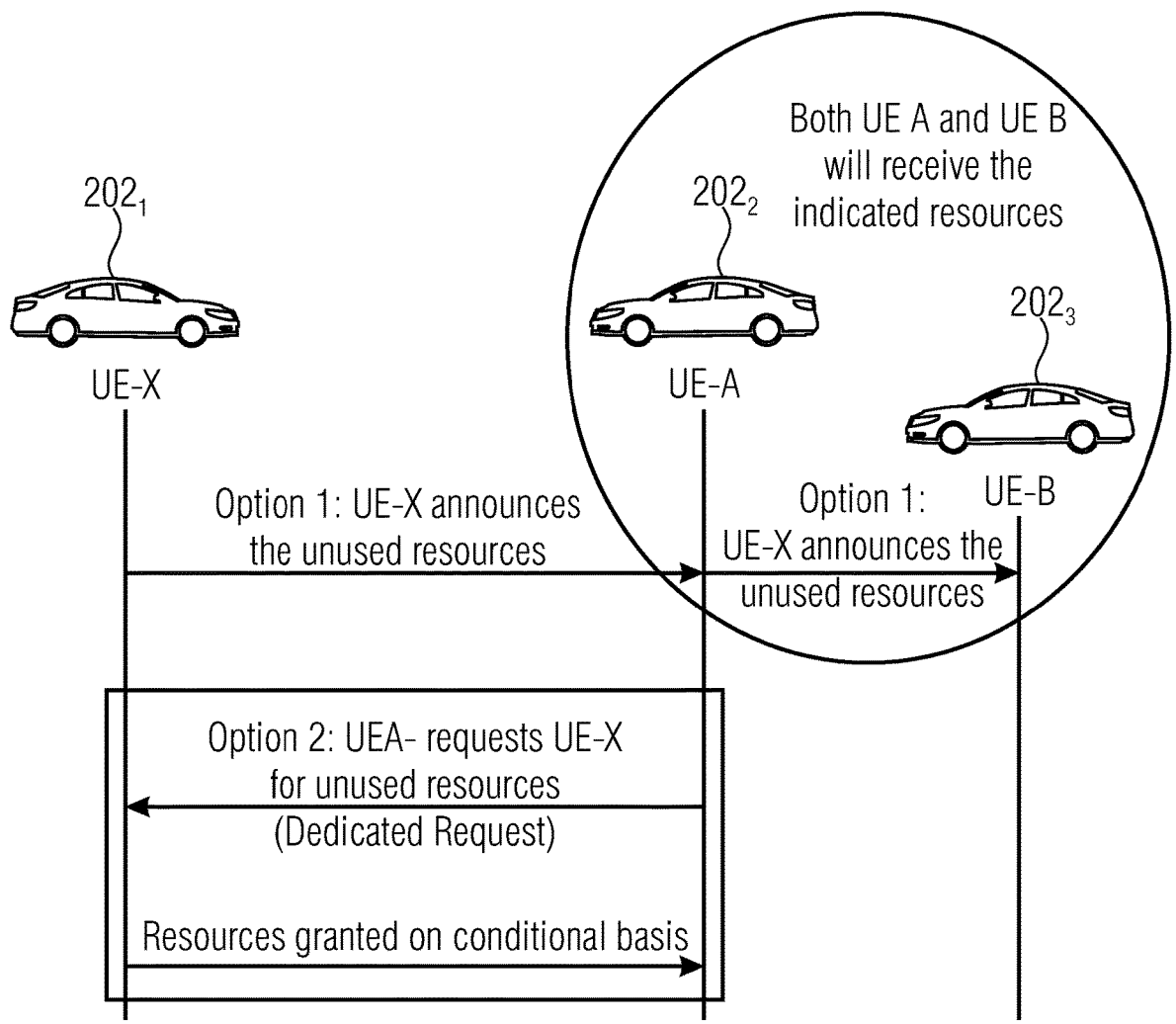
FIG. 9 is a schematic representation of a wireless communication system comprising a first transceiver and at least a second transceiver directly communicating with each other via the sidelink.

In detail, FIG. 9 shows a schematic representation of a wireless communication system comprising a first transceiver $202_1$ (e.g., UE-X) and at least a second transceiver $200_2$ (e.g., UE_A) directly communicating with each other via the sidelink. As indicated in FIG. 9, the first transceiver transceiver $202_1$ (e.g., UE-X) can be configured to report a set of unused resources to the second transceiver $202_2$ (UE-B) and optionally to a third transceiver $202_3$ (UE-B) directly via the sidelink, for example, by transmitting an information describing the set of unused resources. In other words, FIG. 9 shows an example of Resource Announcement.

Option 1: The First Transceiver (e.g., UE-X) Announces the Unused Resources

In embodiments, the first transceiver (e.g., UE-X) that has decided not to use the already granted resources will need to inform other transceivers (e.g., UE's) in proximity about its decision. This will avoid the underutilization of resources as these unused resources now can be used by the other transceivers (e.g., UE's) for their resource selection. One possible procedure is to broadcast the already reserved, but unused resources by the first transceiver (e.g., UE-X). This can be signaled, for example, via the first stage SCI in optionally the following way:

An additional one-bit field can indicate cancellation of the already reserved resources. This can act as a toggling bit which is set to 1 whenever the reserved resources are cancelled. Then, accordingly, in the first stage SCI, the time frequency location of the resources are updated. Note, this is from a first transceiver (e.g., UE-X) perspective. As all receiving transceivers (e.g., UEs) in proximity decode $1^{st}$ stage of SCI, the location of these unused resources from the first transceiver (e.g., UE-X) will be known to the transceivers (e.g., UEs). The implication on the first transceiver (e.g., UE-X) of toggling this bit is w.r.t to its retransmission. This implies when the first transceiver (e.g., UE-X) wants to start a transmission again, it either needs to reselect the resources or it can preempt the ongoing transmission by another transceiver (e.g., UE).

Another possibility w.r.t unicast or groupcast communication specifically could be to include these unused resources only in the second stage of the SCI. The reason is that, when transceivers (e.g., UEs) are in a group or has a unicast link established the source layer 2 ID is clear to all the receiving transceivers (e.g., UEs). A bitmap that explicitly indicates unused resource information can be included in the second stage.

Embodiment 3: Dedicated Reporting of Unused Resources

In this embodiment, an example procedure for forwarding or providing unused resources of the first transceiver (e.g., UE-X) to transceivers (e.g., UEs) in the proximity in case of Mode 2 dedicatedly on request by other transceivers (e.g., UEs). For example, in an out of coverage scenario, a first transceiver (e.g., UE-X) that has unused resources (which are pre-configured) available, could provide them to other transceivers (e.g., UEs) via a dedicated request sent by other transceivers (e.g., UE's) to the first transceiver (e.g., UE-X), as also indicated in Option 2 of FIG. 9.

Option 2: UE's Send a Dedicated Request to UE-X

In embodiments, the transceivers (e.g., UE's (e.g. UE-A)) can send a request for availability of unused resources to the first transceiver (e.g., UE-X). So, the procedure will include a dedicated resource request and granting response from the first transceiver (e.g., UE-X).

The second transceiver (e.g., UE-A) sends a dedicated resource request to other transceivers (e.g., UE(s)) in its proximity, including the first transceiver (e.g., UE-X), which indicates that second transceiver (e.g., UE-A) needs resources to transmit some data with low-latency constraint because depending only on sensing won't achieve this constraint.

The dedicated resource request might be sent via dedicated control or data signaling from the second transceiver (e.g., UE-A) to other transceiver(s) (e.g., UE(s)) in its proximity. Another option might be adding a new one-bit field in the first stage SCI pointing out that the second transceiver (e.g., UE-A), for example, demands dedicated resources. The second transceiver (e.g., UE-A) could send a dedicated request based on the following example conditions:

Within the Minimum Communication range (MCR)

Belonging to the same zone ID

Within a minimum zone-ID difference (e.g., only the next 4 zones can decode this SCI) or a certain threshold of TX-RX distance Belonging to the combination of both TX-RX distance and zoneconfig and MCR.

Up on receiving the dedicated resource request, the first transceiver (e.g., UE-X) only accepts to send his unused or not fully-occupied resources if at least one of the following example conditions applies:

The first transceiver (e.g., UE-X) and the second transceiver (e.g., UE-A) are within the Minimum Communication range (MCR) and/or belonging to the same zone ID.

The first transceiver (e.g., UE-X) and the second transceiver (e.g., UE-A) are within a minimum zone-ID difference (e.g., only the next 4 zones can decode this SCI).

The first transceiver (e.g., UE-X) and the second transceiver (e.g., UE-A) belong to the combination of both TX-RX distance and zoneconfig and MCR.

Data of the second transceiver (e.g., UE-A) sending the dedicated request has a higher priority/higher QoS than that of the first transceiver (e.g., UE-X) and depending on sensing only for resource selection will consume a lot of time which results in not fulfilling latency requirements of the second transceiver (e.g., UE-A) data.

In case that the first transceiver (e.g., UE-X) will give up not fully-occupied resources, then transmissions of the first transceiver (e.g., UE-X) and the second transceiver (e.g., UE-A) will co-exist on some of his resources. To maintain a certain quality level, the first transceiver (e.g., UE-X) measures SL-RSSI received from the dedicated resource request(s) as an indicator of the interference impact on his own transmissions. Accordingly, the first transceiver (e.g., UE-X) chooses to send resource grants to transceivers (e.g., UEs) whose measured RSSI values are below a certain threshold (optionally: Pre-defined).

Sidelink CSI-based procedure for the first transceiver (e.g., UE-X) to accept sharing its own resources with other transceiver (e.g., UE):

Upon receiving dedicated resource request, the first transceiver (e.g., UE-X) enables a Channel State Information reporting by sending a SCI format 0-1 with "CSI request" field enabled to his own peers and/or resource-requesting transceivers (e.g., UEs) [7], [8]. The first transceiver (e.g., UE-X) configures CSI reporting for a certain set of resources rather than the whole band.

After receiving CSI reports, the first transceiver (e.g., UE-X) compares CQI reported values with his own values intended for transmission. The lower the CQI indices in CSI report are, the lower the MCS values can be for communication on the channel between the first transceiver (e.g., UE-X) and his peers. The first transceiver (e.g., UE-X) accepts giving resource grants and/or coexist on his own resources if CQI_reported from UEs communicating with the first transceiver (e.g., UE-X)>CQI values intended for the first transceiver (e.g., UE-X) transmission so that it's guaranteed that receivers of transceivers (e.g., UEs) addressed by the first transceiver (e.g., UE-X) are still able to successfully receive data from the transceiver (e.g., UE-X) in case the first transceiver (e.g., UE-X) uses all/some of his own resources for future transimissions.

In case of unicast and/or multicast communication with enabled HARQ process and the first transceiver (e.g., UE-X) didn't receive NACK messages on PSFCH. So, this means no retransmissions are used and UEs addressed by the first transceiver (e.g., UE-X) are able to correctly receive its data.

In case of more than one dedicated resource request, resource-requesting transceivers (e.g., UEs) with lowest reported CQ values have a higher chance to receive resource grants from the first transceiver (e.g., UE-X). Since low CQ values indicate that the channel between them and first transceiver (e.g., UE-X) is quite bad their interference effect on transmissions of the first transceiver (e.g., UE-X) won't be significant.

Another point specific to transceivers (e.g., UE's), who have already a unicast or groupcast link established shall be that all the transceivers (e.g., UEs) in the vicinity of the first transceiver (e.g., UE-X) monitors the PSFCH channel. Whenever the first transceiver (e.g., UE-X) receives a NACK on PSFCH it does not share the unused resources with transceivers (e.g., UEs) in the vicinity. Hence, the number of transceivers (e.g., UE's) that contest on similar resources is also reduced.

Embodiment 4: Forwarding of Unused Resources Via Discovery Type 1

This embodiment describes an example procedure of providing unused resources dedicatedly to a limited set of transceivers (e.g., UE's) via Discovery type 1. When the transceivers (e.g., UE's) are out-of-coverage and need to be made aware of a presence of a first transceiver (e.g., UE-X) that is capable to donate its unused resources for a configured amount of time, then a discovery procedure could be another possibility.

Discover Via Announcement

Figure 10:
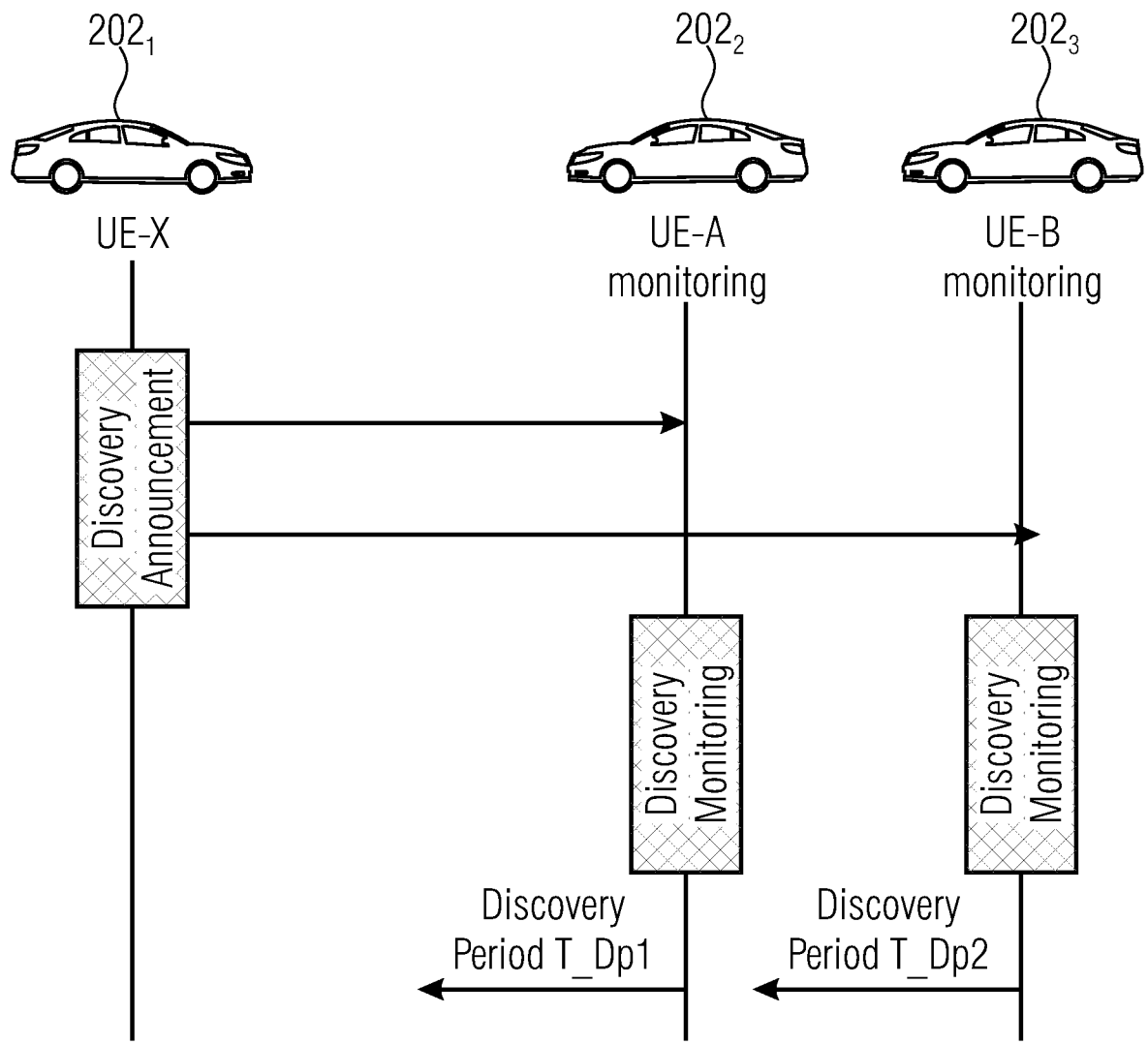
FIG. 10 is a schematic representation of a wireless communication system comprising a first transceiver and at least a second transceiver directly communicating with each other via the sidelink.

Following along the line of Model A ("I am here") of Discovery from D2D in the introduction of the present patent application, the following general procedure can be established, see FIG. 10.

In detail, FIG. 10 shows a schematic representation of a wireless communication system comprising a first transceiver $202_1$ (e.g., UE-X) and at least a second transceiver $200_2$ (e.g., UE_A) directly communicating with each other via the sidelink. In other words, FIG. 10 shows an illustrative view of an example of a Discovery Procedure via Announcement.

Option 1: Discovery Beacon

In this procedure a sidelink discovery beacon is transmitted as standalone information before the first stage SCI or punctured in the first SCI, which contains the time frequency location of the unused resources by the first transceiver (e.g., UE-X) along with the number of occasions these resources can be utilized for (RSVP like).

Standalone sidelink discovery information could be either adjacent to the first stage SCI or non-adjacent. The transceiver (e.g., UE's) in the proximity based on their supported traffic type (periodic/aperiodic), QoS including the supported MCR try to decode this sidelink discovery beacon opportunistically based on the configured discovery period by the higher layers. If the first transceiver (e.g., UE-X) decides to stop the sharing of the unused resources, e.g., due to emergency messages triggered, then it broadcasts, for example, via a sidelink discovery beacon, an announcement to the transceivers (e.g., UE's) in proximity to stop the sharing or setting the number of occasions to '0'.

Option 2: Discovery Channel

Alternatively, a discovery channel for NR-V2X can be defined which contains the discovery period, duration of the resource validity, information from the second stage SCI of the time, frequency resource location, along with the destination ID.

Option 3: Keep-Alive Message

Another approach which is more applicable in case of groupcast or unicast in order to identify how long the resource sharing is applicable is to use the PC5-S signaling. The Keep-alive signaling in the upper layers (NAS) could be instead used by the first transceiver (e.g., UE-X) to inform the second transceiver (e.g., UE1), third transceiver (e.g., UE2) about the resource validity based on their established link. Once the timer T402 [TS 23.334] runs out, the sharing of resources is automatically ended. Hence, here the first transceiver (e.g., UE-X) will have the capability to initiate a new keep-alive procedure if it has un-used resources available and the keep-alive counter will be set depending upon the first transceiver (e.g., UE_X).

Embodiment 5: Forwarding of Unused Resources Via Discovery Type 2

This embodiment describes an example procedure of providing unused resources dedicatedly to a limited set of transceivers (e.g., UE's) on a dedicated request via Discovery type 2. When the transceivers (e.g., UE's) are in out-of-coverage and need to be made aware of a presence of a first transceiver (e.g., UE X) that is capable to donate its unused resources for a configured amount of time then a discovery procedure could be another possibility.

Figure 11:
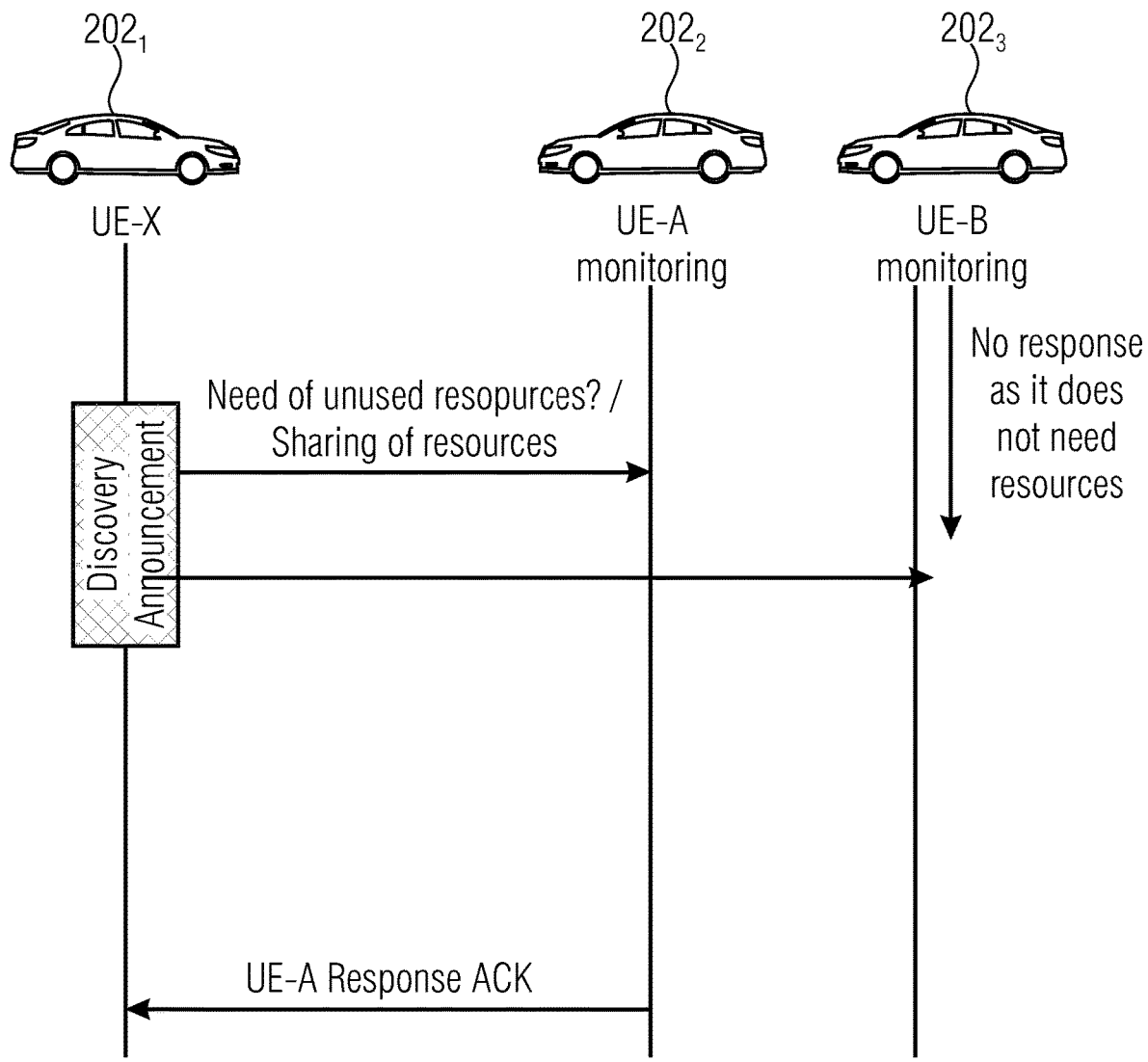
FIG. 11 is a schematic representation of a wireless communication system comprising a first transceiver and at least a second transceiver directly communicating with each other via the sidelink.

FIG. 11 shows a schematic representation of a wireless communication system comprising a first transceiver $202_1$ (e.g., UE-X) and at least a second transceiver $200_2$ (e.g., UE_A) directly communicating with each other via the sidelink. In other words, FIG. 11 shows an illustrative view of an example of a Dedicated Discovery response.

In this option, the second transceiver (e.g., UE-A) requests resources from transceivers (e.g., UEs) in the vicinity and first transceiver (e.g., UE-X) responds to this request via its resources. Then, the transceiver (e.g., UE) which is in need of the unused resources will send back an acknowledgement to the first transceiver (e.g., UE-X) (the second t transceiver (e.g., UE1) in FIG. 11). After receiving the acknowledgement the first transceiver (e.g., UE-X) sends out the information related to the location of the unused resources, along with the intended time for which the transceiver (e.g., UE), e.g. first transceiver (e.g., UE-1), can use this resource. The discovery request sent by the first transceiver (e.g., UE-X) can be restricted by the MCR supported by the first transceiver (e.g., UE-X) itself and also the TX-RX distance, i.e., the zone configuration w.r.t the transceivers (e.g., UE's) in proximity.

Embodiment 6: Transceiver to Transceiver (e.g., UE-UE) Signaling Procedure Specific to Pedestrians and with RSU or Relay [Initial Version]

The inter-transceiver (e.g., inter-UE) coordination, i.e. forwarding of the unused resources by first transceiver (e.g., UE-X) can also be forwarded to pedestrian transceivers (e.g., UEs), such as pedestrians, motorcycles, bicycles etc.

who can then utilize this set of resources directly and discontinue sensing in order to save energy. Another possibility could be that a UE-type RSU or a relay, e.g., L3 or L2 collects these unused set of resources and broadcasts it to the pedestrian UEs in the vicinity based on the geolocation of the Pedestrian UEs.

Embodiment 7: Inter-UE Coordination for Groupcast [Initial Version]

This embodiment deals with a special case of inter-transceiver (e.g., inter-UE) coordination within a group. In case of a centralized group scheme, the first transceiver (e.g., UE-X) behaving as a group leader forwards the resources unused by it to the transceivers (e.g., UEs), which belong to its group. This forwarding of resources can either be done dedicatedly via PC5-RRC, i.e. a unicast link is established per transceiver (e.g., UE). An example of the sharing of these unused resources via MeasurementSidelink IE is as follows. Thereby, Thereby, in the below example, elements being highlighted in yellow may be provided, modified or changed according to the inventive approach described herein.

```
- -- ASN1START
- -- TAG-MEASUREMENTREPORTSIDELINK-START
-
- MeasurementReportSidelink :: =                    SEQUENCE
  {
-   criticalExtensions
    CHOICE {
-       measurementReportSidelink-r16
    MeasurementReportSidelink-IEs-r16,
-       criticalExtensionsFuture
    SEQUENCE { }
-   }
- }
- MeasurementReportSidelink-IEs-r16 ::=             SEQUENCE
  {
-    sl-measResults-r16                             SL-
  MeasResults-r16,
-    lateNonCriticalExtension                       OCTET
  STRING
  OPTIONAL,
-    nonCriticalExtension
  SEQUENCE { }
  OPTIONAL
- }
-
- SL-MeasResults-r16 ::=                            SEQUENCE
  {
-    sl-MeasId-r16                                  SL-
  MeasId-r16,
-    sl-MeasResult-r16                              SL-
  MeasResult-r16,
-    ...
- }
-
- SL-MeasResult-r16 ::=                             SEQUENCE
  {
-    sl-ResultDMRS-r16                              SL-
  MeasQuantityResult-r16
  OPTIONAL,
-    ...
- }
-
- SL-MeasQuantityResult-r16 ::=                     SEQUENCE
  {
-    sl-RSRP-r16                                    RSRP-
  Range
  OPTIONAL,
-    ...
- }
- - SL-UnusedResourcesResults-r* :: =
  SEQUENCE { }
  OPTIONAL,
  ... .
  }
  ... .
- -
- -- TAG-MEASUREMENTREPORTSIDELINK-STOP
- -- ASN1STOP
```

Alternatively, another example could be that the first transceiver (e.g., UE-X) broadcasts this set of resources with its source layer2 ID to transceivers (e.g., UEs) with their respective destination IDs in the group. Another possibility specific to a group of pedestrian UEs could be that the unused resource set the first transceiver (e.g., UE-X) offered to other transceivers (e.g., UEs) is a function of the DRX active period. This means the same set of unused resources at the first transceiver (e.g., UE-X) might be offered to different transceivers (e.g., UEs) based on their individual DRX on times. Hence, this will result in efficient resource utilization.

Embodiment 8: Additional Criteria for Signaling Procedure

This embodiment points out additional criteria which the first transceiver (e.g., UE-X) can utilize for triggering the reporting of unused/suspending resources.

1. Congestion Measurement

The first transceiver (e.g., UE-X) can also consider the for example CBR measurements which are evaluated by it in order to decide if the unused resources are to be reported or not. For example, if the CBR of the resource pool is greater than 60% even if the first transceiver (e.g., UE-X) does not intend to use it for the next slots it is better not to report these resources as this may lead to more collision for the transceiver (e.g., UE) which will try to access this resource. If CBR is high (high traffic load on resource pool), i.e. above a defined CBR threshold, then reserved resources could be offered as other transceivers (e.g., UEs) may have a low chance to allocate resources using sensing. If the CBR is low, offering resources may not be required as any transceivers (e.g., UEs) may allocate sufficient resources.

2. The First Transceiver (e.g., UE-X) Announces Predicted-Based Resources

In NR V2X mode 2, a first transceiver (e.g., UE-X) can predict a situation where the coverage of the base station (e.g., gNB) is limited by some obstacles, e.g., tunnel, and announce the radio time/frequency resources that can be used by the nearby users.

Wherein a user can exploit for example auxiliary information available from, e.g., GNSS, GIS data, from other sensors to predict the situation, e.g., tunnel, shadowing area.

Wherein the radio resource time instances configured by the higher layer signaling, e.g., RRC signaling messages, or SCI, can be signaled in:

Time/frequency fields in 1st SCI, if one bit is present in the 1st SCI to indicate the resource reservation suspending/reservation.

A transceiver (e.g., UE) who receives the control information with resource reservation suspending signaling, can undertake the following steps in the resource selection procedure in [7, subclause 8.1.4]:

A set Sc is initialized to an empty set.

A UE receives the SCI format in slot n, the list of radio time/frequency resources indicated in the 1st SCI or the radio time/frequency resources, if the "resource reservation period" field is present, in the SCI format 0-1. Wherein the UE adds the list of radio time/frequency resources into the set Sc, if "suspending the initial reservation," field is present in the 1st SCI format 0-1.

If the number of candidates in single-slot resources remaining in the set Sa+Sc is smaller than 0.2 Mtotal, the Th(pi) is increased by 3 dB for each priority level pi, and the sensing procedure continues until 20% of the resources are fullfiled.

Where Mtotal, Th (pi) are the union of the radio frequency/time resources configured by the higher layer signaling, and Th (pi) is RSRP threshold for a specific priority pi in the received SCI format 0-1.

3. Predicted Handover and Alternative QoS

The first transceiver (e.g., UE-X) can also take into account the mobility information example the predictive handover that might experience and then decide whether to carry any of the procedures stated in Embodiment 1-7. Also, if the first transceiver (e.g., UE-X) knows about the possible QoS that will experience in the next subframes then it might decide to keep the unused resources for itself if the alternative QoS is expected to be good. This alternative QoS is valid for both Uu and Sidelink. In case, the first transceiver (e.g., UE-X) receives a request from other UEs regarding its unused resources then mechanism in Embodiment 1-7 is followed.

Embodiment 9: Additional Definition of Set of Resources, Message Formats

The inter-transceiver (e.g., inter-UE) coordination is a proposed resource allocation enhancement where by definition, "a set of resources is determined at the first transceiver (e.g., UE-A). This set is sent to the second transceiver (e.g., UE-B) in mode 2, and the second transceiver (e.g., UE-B) takes this into account in the resource selection for its own transmission".

The set of resources can be seen as an assistance information or coordination information. This assistance information or coordination information can be defined as, but not limited to, for example:

set of unused resources, set of available resources, sensing information i.e. complete raw signal measurement, sensing report Resource set which is preferred for the second transceiver's (e.g., UE-B's) transmission, e.g., Resource set which is preferred for the first transceivers (e.g., UE-A's) reception Resource set which is preferred for intended receiver(s) of the second transceiver (e.g., UE-B's) transmission Resource set which is preferred not to be used by the second transceiver's (e.g., UE-B's) transmission e.g., Resource set which is not preferred for the first transceiver's (e.g., UE-A's) reception Resource set with a problem for intended receiver(s) of the second transceiver's (e.g., UE-B's) transmission Resource map e.g. resource(s) for current transmission along with future reservation(s). It can be seen for example seen a matrix containing first transceiver's (e.g., UE-A's) planned reservation and/or additionally other reserved resource(s) set of transceivers (e.g., UEs) in proximity that the first transceiver (e.g., UE-A) is aware of.

Which is sent to the transceiver (e.g., UE) to aid its resource allocation procedure e.g. in sensing procedure, in resource selection or resource exclusion procedure. The signaling procedure as well as the reporting described in previous embodiments are applicable to this alternative definition as well. The format of this assistance information or coordination information can be a higher layer e.g. RRC or PC5-RRC message, MAC CE and/or a physical layer format as well. In the physical layer a new SCI format for second stage can be defined which could of two possible types e.g.

1. Long SCI format: This for example contains the complete or detailed assistance information or coordination information e.g. sensing measurement, complete set of resource map of all transmissions including also the destination ID (group ID), source ID or an assistance information or coordination information ID for differentiating that it is an assistance information or coordination information, QoS e.g. priority, zone ID (e.g. location information), MCR.
2. Short SCI format: This for example contains the exact resource(s) location, including also the destination ID, source ID or an assistance information or coordination information ID for differentiating that it is an assistance information or coordination information, QoS e.g. priority, zone ID (e.g. location information), MCR.
3. Another option could be to add in the existing SCI format in $1^{st}$ or $2^{nd}$ stage assistance information or coordination information message ID.

Embodiment 10: Bandwidth Adaption in Power Saving Transceivers (e.g., UEs) Using Inter Transceiver (e.g., Inter-UE) Coordination A power saving transceiver (e.g., UE), e.g., pedestrian user, may alter the number of a resource pool to be monitored in a (pre-) configured BWP, wherein the radio frequency/time resources can be resource pool comprising several subchannels in a configured or pre-configured bandwidth part (BWP) that can be configured via RRC, DCI.

A power saving transceiver (e.g., UE) might shrink RX resource pool(s) to reduce power consumption at the receiver side. On the other hand, transceivers (e.g., UEs) transmitting to the power saving transceiver (e.g., UE) should be informed to avoid the transmission on the part of bandwidth that is not monitored by the recipients. To do so, the power saving transceiver (e.g., UE) needs to signal assisted information indicating the preferred monitored bandwidth. Wherein the monitored bandwidth comprises resource pool(s), identified by resource pool ID. Moreover, the assisted information is conveyed by a new second stage SCI format or PC5-RRC message and is triggered when the power saving conditions are met.

At the transmitter, when transceivers (e.g., UEs) receive the assisted information message, including a request for bandwidth reduction, takes the following actions according to the resource selection procedure in TS 38.214, step 5:

Transceivers (e.g., UEs) may send a combination of identified candidate resources of its own transmission and a set of resource pools that should not be preferred for transmission to the higher layer, or Transceivers (e.g., UEs) may exclude a set of not preferred resources from the identified resources set through its own sensing and send the remaining resources to the higher layer.

Embodiment 11: Receiving Transceivers (e.g., UEs) Behavior of Inter-Transceiver (e.g., Inter-UE) Coordination Message If the inter-transceiver (e.g., inter-UE) coordination feature is enabled in the network, the resource selection procedure can be enhanced depending on the received assisted message's contextual information.

In embodiments, the contextual information may comprise the following set of resources:
A preferred set of resources
A not preferred set of resources In embodiments, the contextual information can be conveyed in $2^{nd}$ SCI format XXX indicated by $1^{st}$ SCI.

In case of a preferred set of resources, the receiving transceiver (e.g., UE) may undertake the followings steps according to the resource selection procedure in 38.214:

The receiving transceiver (e.g., UE) considers a set of preferred resources and combines it with its identified resources through sensing. The transceiver (e.g., UE) then sends this combination to the higher layer, e.g. MAC, or The receiving transceiver (e.g., UE) compares a set of preferred resources with its identified resource set through sensing, and the differences between the two sets are sent to the higher layer e.g. MAC.

When a set of the not preferred resource is indicated, the receiving transceiver (e.g., UE) may act as follows:

The receiving transceiver (e.g., UE) combines indicated resources and its identified resource set through sensing and sends this combination to the higher layer, wherein a combination can be a subtract of two sets of resources, or The transceiver (e.g., UE) sends both sets of resources to the higher layer e.g. MAC, and the exclusion procedure is taken place in the higher layer e.g. MAC, or The transceiver (e.g., UE) excludes the set of not preferred resources from its monitored resource set according to Step 5 in 38.214 when there is overlap between two sets of resources.

Embodiment 12: Assisted Pre-Emption

A problem in high density scenarios are colliding resource selections. The resource reservation procedure introduced in rel. 16 improves the collision probability to some extent. Although it is not possible to guarantee collision free transmission of the resource reservation information the probability is minimized because a resource reservation occupies the smallest possible resource size, i.e. one subchannel and one slot. If resource reservations do not collide it is still possible that they claim colliding resources. To prevent this pre-emption has been introduced in rel. 16.

However, resource reservation with pre-emption cannot prevent collisions if different transceivers (e.g., UEs) transmit resource reservations in the same slot. Due to the half-duplex operation they cannot be informed about the other reservation(s) and thus cannot recognize if they are overlapping. In this case, a pre-emption would never happen.

However, another third transceiver (e.g., UE) that has received the reservation information is able to recognize the upcoming collision. Such a transceiver (e.g., UE) can assist in taking over the transmission of a pre-emption.

Figure 12:
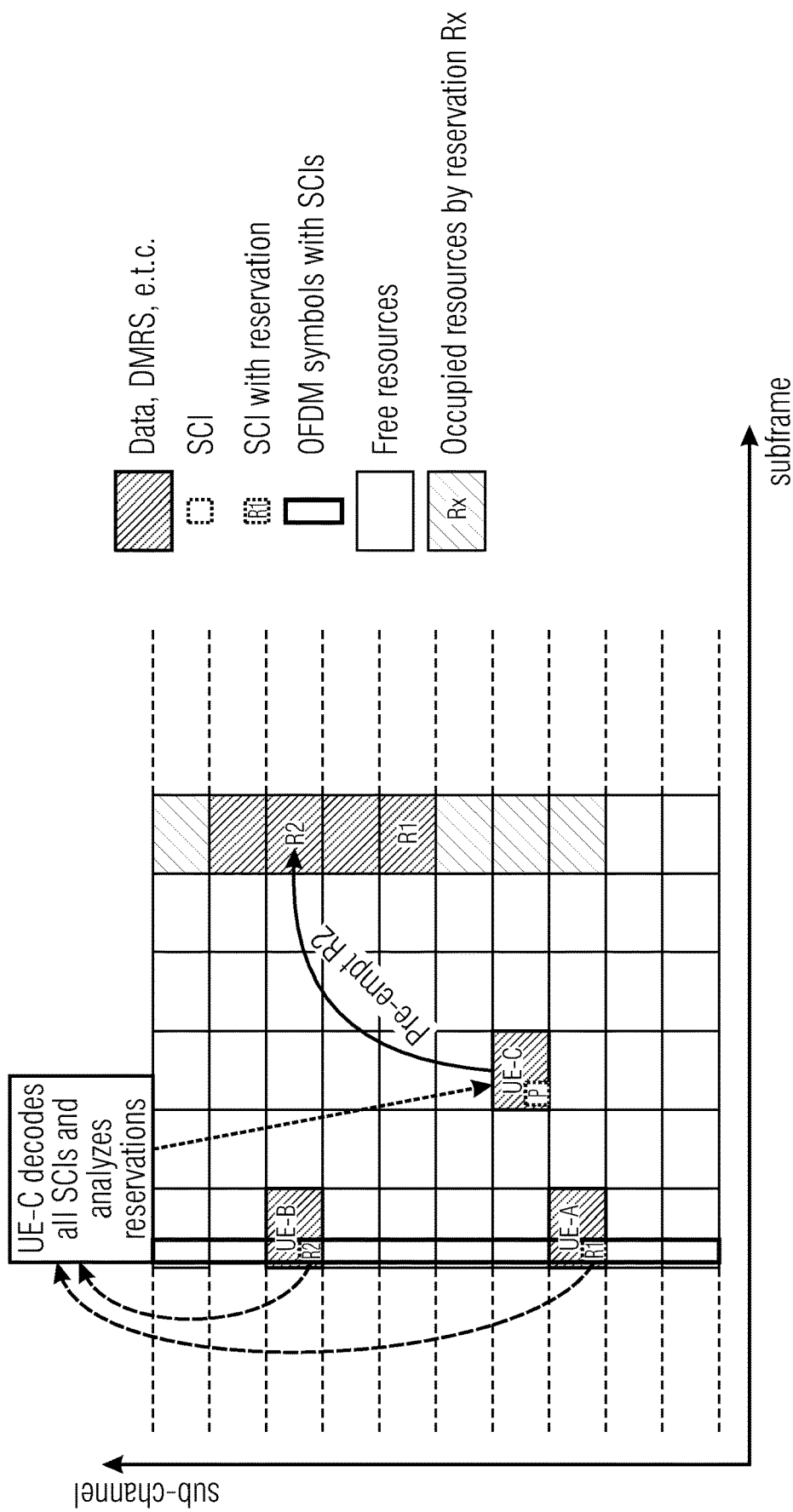
FIG. 12 shows in a diagram an illustrative view of an assisted pre-emption of reserved resources.

FIG. 12 illustrates this scenario. In Detail, FIG. 12 shows in a diagram an illustrative view of an assisted pre-emption (e.g., of reserved resources). As shown in FIG. 12, two transceivers (e.g., UEs, like UE-A and UE-B) transmit a reservation information in the same slot, so that they are not aware of each other. A third transceiver (e.g., UE, like UE-C) was receiving at the same time and thus is informed about both reservations. Comparing the reservations, the third transceiver (e.g., UE-C) is able to detect if they are overlapping. Based on the priorities it is able to pre-empt the lower priority reservation in assistance to the transmitting transceivers (e.g., UEs) which are not able to do so.

In case of equal priorities, the pre-empted transceiver (e.g., UE) can be selected randomly or no pre-emption is sent. In the latter case, the collision would be accepted.

The pre-emption assistance is also possible if more than two transceivers (e.g., UEs) transmit a reservation of colliding resources in the same slot.

A transceiver (e.g., UE) that prepares to assist the pre-emptions needs to observe other pre-emptions to avoid multiple pre-emption of the same target.

Further Embodiments

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Figure 13:
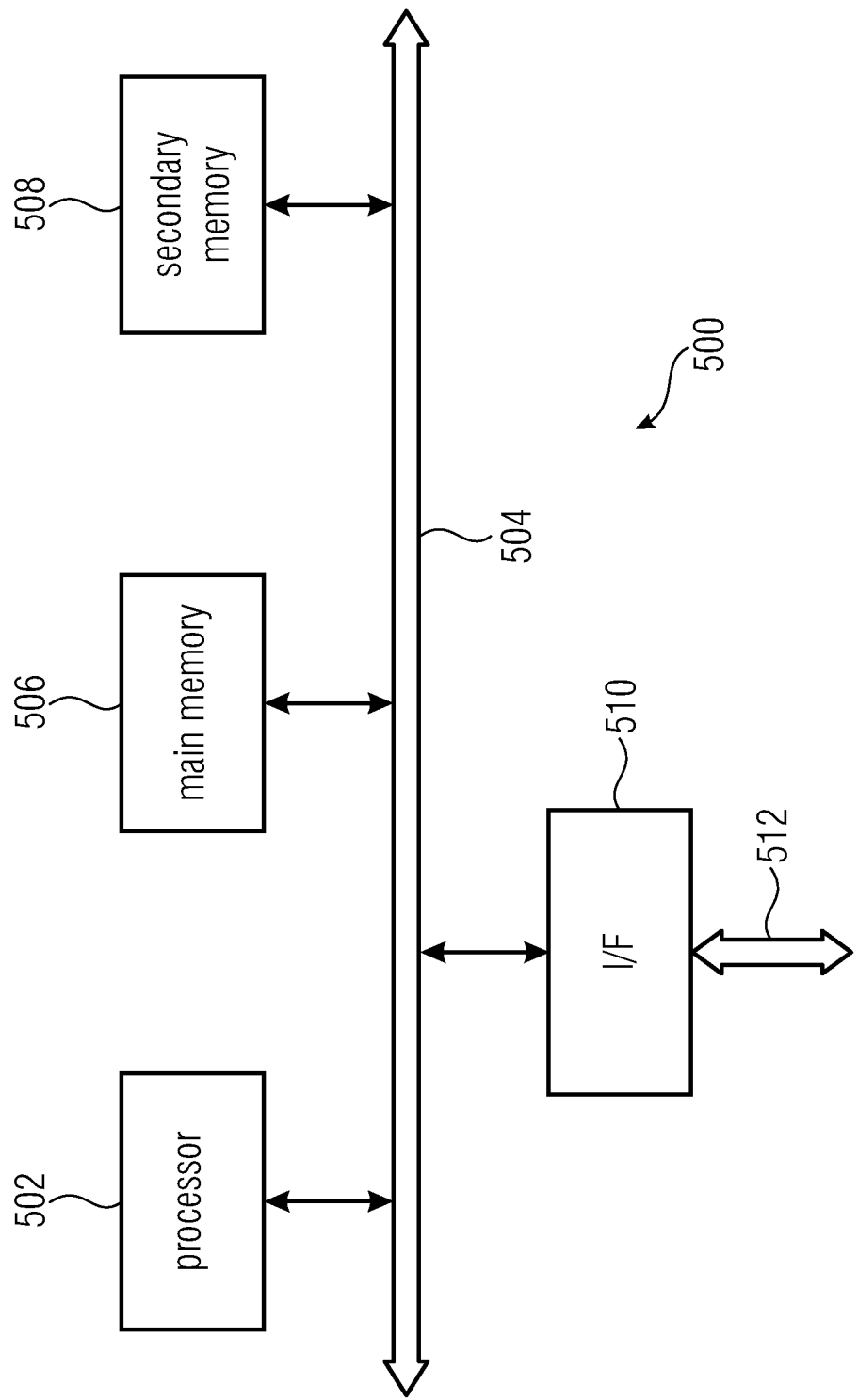
FIG. 13 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 13 illustrates an example of a computer system 500. The units or modules as well as the steps of the methods performed by these units may execute on one or more computer systems 500. The computer system 500 includes one or more processors 502, like a special purpose or a general-purpose digital signal processor. The processor 502 is connected to a communication infrastructure 504, like a bus or a network. The computer system 500 includes a main memory 506, e.g., a random-access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the form of electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] RP-193231: New WID on NR sidelink enhancement, December 2019
[2] TR 38.885
[3] TS 36.300
[4] TS 23.303
[5] TS 36.331
[6] TS 38.331
[7] TS 38.214
[8] TR 37.985
[9] 38.213

Abbreviations

VRU Vulnerable road user
DRX Discontinuous reception
V-UE Vehicular UE
P-UE Pedestrian UE: should not be limited to pedestrians, but represents any UE with a need to save power, e.g., electrical cars, cyclists,
MCR Minimum Communication Range
CSI-RS Channel State Information—Reference Signal
CQI Channel Quality Indicator
PSFCH Physical Sidelink Feedback Channel
HARQ Hybrid Automatic Repeat Request
NACK Negative Acknowledgement

The invention claimed is:

1. A method for sharing resources between at least two transceivers of a wireless communication system, at least a first transceiver and a second transceiver of the at least two transceivers operating in a NR sidelink mode 2, in which resources for a sidelink communication over a sidelink are scheduled autonomously, the method comprising:
reporting, by a first transceiver of the at least two transceivers, a set of resources to the second transceiver by transmitting an information describing the set of resources,
determining, by the second transceiver, a set of candidate resources out of the resources of the sidelink taking into account the set of resources reported by the first transceiver,
performing, by the second transceiver, a sidelink transmission using selected resources selected out of the set of candidate resources,
wherein the set of resources is determined at the first transceiver,
wherein the set of resources is a set of not preferred resources which is not preferred for the sidelink transmission of the second transceiver,
transmitting, with the second transceiver, a first reservation information indicating a reservation of one or more selected resources selected by the second transceiver for a first sidelink transmission,
transmitting, with a third transceiver, a second reservation information indicating a reservation of one or more selected resources selected by the third transceiver for a second sidelink transmission,
receiving, with the first transceiver, the first reservation information and the second reservation information and determining whether at least one reserved resource is reserved by both the first reservation information and the second reservation information,
transmitting, with the first transceiver, an assistance information or coordination information to the second transceiver or the third transceiver, wherein the assistance information or coordination information is configured to control the respective transceiver to pre-empt the at least one reserved resource.

2. The method according to claim 1, wherein the information describing the set of resources is one out of
the set of resources itself,
a sensing information, and
a resource map.

3. The method according to claim 1, wherein the set of resources reported from the first transceiver to the second transceiver comprises a set of resources selected by the first transceiver in dependence on a selection criterion.

4. The method according to claim 1, wherein the information describing the set of resources is transmitted from the first transceiver to the second transceiver via
a physical layer, or
a higher layer.

5. The method according to claim 1, wherein the set of resources indicated by the information js determined by the first transceiver by monitoring a number of resource pools in a bandwidth part, wherein the number of monitored resource pools is adaptively adjusted in dependence on a power consumption criterion.

6. The method according to claim 5, wherein the method further comprises transmitting from the first transceiver to the second transceiver or another transceiver of the wireless communication system an information describing the resource pools of the bandwidth part that are monitored by the first transceiver.

7. The method according to claim 6, wherein the information is transmitted via a second stage SCI format or a PC5-RRC message.

8. The method according to claim 1, wherein the method further comprises transmitting a contextual information from the first transceiver to the second transceiver, wherein the contextual information describes at least one out of a set of preferred resources, and a set of not preferred resources.

9. The method according to claim 8, wherein the sidelink transmission is performed by the second transceiver using selected resources selected out of the set of candidate resources based on the set of preferred resources and/or the set of not preferred resources.

10. The method according to claim 8, wherein the contextual information is transmitted via a second SCI format indicated by a first SCI.

11. The method according to claim 9, wherein, in case that the contextual information describes a set of not preferred resources, the set of not preferred resources may be excluded from the set of candidate resources.

12. The method according to claim 1, wherein the first reservation information and the second reservation information are transmitted in a same slot.

13. A first transceiver of a wireless communication system, wherein the first transceiver is configured to operate in a NR sidelink mode 2, in which resources for a sidelink communication over a sidelink are scheduled autonomously by the first transceiver, wherein the first transceiver is configured to determine a set of resources and to report the set of resources to a second transceiver of the wireless communication system, wherein the set of resources is a set of not preferred resources which is not preferred for a sidelink transmission of the second transceiver, wherein the first transceiver is configured to receive from the second transceiver a first reservation information indicating a reservation of one or more selected resources selected by the second transceiver for a first sidelink transmission, wherein the first transceiver is configured to receive from a third transceiver a second reservation information indicating a reservation of one or more selected resources selected by the third transceiver for a second sidelink transmission, wherein the first transceiver is configured to transmit, in case that the first reservation information and the second reservation information indicate that at least one reserved resource is reserved by both the first reservation information and the second reservation information, an assistance information or coordination information to the second transceiver or the third transceiver, wherein the assistance information or coordination information is configured to control the respective transceiver to pre-empt the at least one reserved resource.

14. A second transceiver of a wireless communication system, wherein the second transceiver is configured to operate in a NR sidelink mode 2, in which resources for a sidelink communication over a sidelink are scheduled autonomously by the second transceiver, wherein the second transceiver is configured to receive from a first transceiver of the wireless communication system an information describing a set of resources, wherein the set of resources is determined at the first transceiver, wherein the set of resources is a set of not preferred resources which is not preferred for a sidelink transmission of the second transceiver, wherein the second transceiver is configured to transmit a reservation information indicating a reservation of one or more selected resources selected by the second transceiver for a sidelink transmission, wherein the second transceiver is configured to receive from the first transceiver an assistance information or coordination information, wherein the assistance information or the coordination information is transmitted by the first transceiver in case that the first reservation information of the second transceiver and a second reservation information of a third transceiver indicate that at least one reserved resource is reserved by both the first reservation information and the second reservation information, the second reservation information indicating a reservation of one or more selected resources selected by the third transceiver for a second sidelink transmission, wherein the second transceiver is configured to pre-empt the at least one reserved resource based on the assistance information or coordination information.

\* \* \* \* \*